United States Patent
Weldy

(10) Patent No.: US 9,975,463 B2
(45) Date of Patent: *May 22, 2018

(54) LOWERING SUSPENSION

(71) Applicant: Ross Weldy, Bristol, IN (US)

(72) Inventor: Ross Weldy, Bristol, IN (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/498,775

(22) Filed: Apr. 27, 2017

(65) Prior Publication Data

US 2017/0246975 A1    Aug. 31, 2017

Related U.S. Application Data

(63) Continuation-in-part of application No. 15/163,754, filed on May 25, 2016, now Pat. No. 9,649,967, which is a continuation-in-part of application No. 14/581,459, filed on Dec. 23, 2014, now Pat. No. 9,352,678.

(60) Provisional application No. 61/621,685, filed on Apr. 9, 2012.

(51) Int. Cl.

| | |
|---|---|
| *B60G 17/00* | (2006.01) |
| *B60P 1/18* | (2006.01) |
| *B60P 1/43* | (2006.01) |
| *B60P 1/02* | (2006.01) |
| *B60P 1/08* | (2006.01) |
| *B60G 11/22* | (2006.01) |
| *B60G 17/017* | (2006.01) |
| *B60G 17/027* | (2006.01) |

(52) U.S. Cl.
CPC .............. *B60P 1/18* (2013.01); *B60G 11/225* (2013.01); *B60G 17/017* (2013.01); *B60G 17/027* (2013.01); *B60P 1/027* (2013.01); *B60P 1/08* (2013.01); *B60P 1/431* (2013.01); *B60G 2202/41* (2013.01); *B60G 2300/02* (2013.01); *B60G 2300/38* (2013.01); *B60G 2500/324* (2013.01); *B60G 2800/203* (2013.01)

(58) Field of Classification Search
CPC ........................... B60G 17/017; B60G 17/027; B60G 2300/38; B60G 2800/203; B60P 1/08; B60P 1/431; B60P 1/027
USPC ...................... 280/6.151, 6.153, 53.11, 414.1
See application file for complete search history.

(56) References Cited

U.S. PATENT DOCUMENTS

| | | | | |
|---|---|---|---|---|
| 4,260,315 A | * | 4/1981 | Bouffard | B60P 3/122 280/43.11 |
| 4,290,733 A | * | 9/1981 | Lahman | A01D 87/126 280/83 |
| 5,975,828 A | * | 11/1999 | Weldy | B60P 1/08 414/484 |

(Continued)

*Primary Examiner* — Toan To
(74) *Attorney, Agent, or Firm* — Botkin & Hall, LLP

(57) ABSTRACT

A vehicle lowering system having a cargo surface with an adjacent pivoting arm is connected to a vehicle at a pivot point. The pivoting arm moves between a raised and a lowered position by an actuator that is affixed to a frame and the pivoting arm. The frame has an upper portion and a lower portion that provides structure for the portion of the frame that is beyond the pivot point and actuator. The pivot arm has a spindle that holds and allows a wheel to rotate. The spindle has an axis that is always located above the cargo surface. The actuator is movable between an extended position and a retracted position. When the actuator moves between the extended and retracted position, the pivoting arm moves the vehicle between a raised and a lowered position.

20 Claims, 21 Drawing Sheets

(56) References Cited

U.S. PATENT DOCUMENTS

| | | | | |
|---|---|---|---|---|
| 6,135,700 | A * | 10/2000 | Collins | B60P 3/07 |
| | | | | 280/43.23 |
| 6,592,139 | B1 * | 7/2003 | Shanahan | B60P 1/027 |
| | | | | 280/414.5 |
| 7,137,642 | B2 * | 11/2006 | Mitchell | B60G 9/00 |
| | | | | 280/418.1 |
| 7,243,979 | B1 * | 7/2007 | Stene | B60P 1/027 |
| | | | | 296/163 |
| 8,267,410 | B1 * | 9/2012 | Stutz | B60G 5/00 |
| | | | | 280/43.23 |
| 9,649,967 | B2 * | 5/2017 | Weldy | B60G 17/027 |
| 2006/0186616 | A1 * | 8/2006 | Rudiger | B60G 3/14 |
| | | | | 280/6.15 |

* cited by examiner

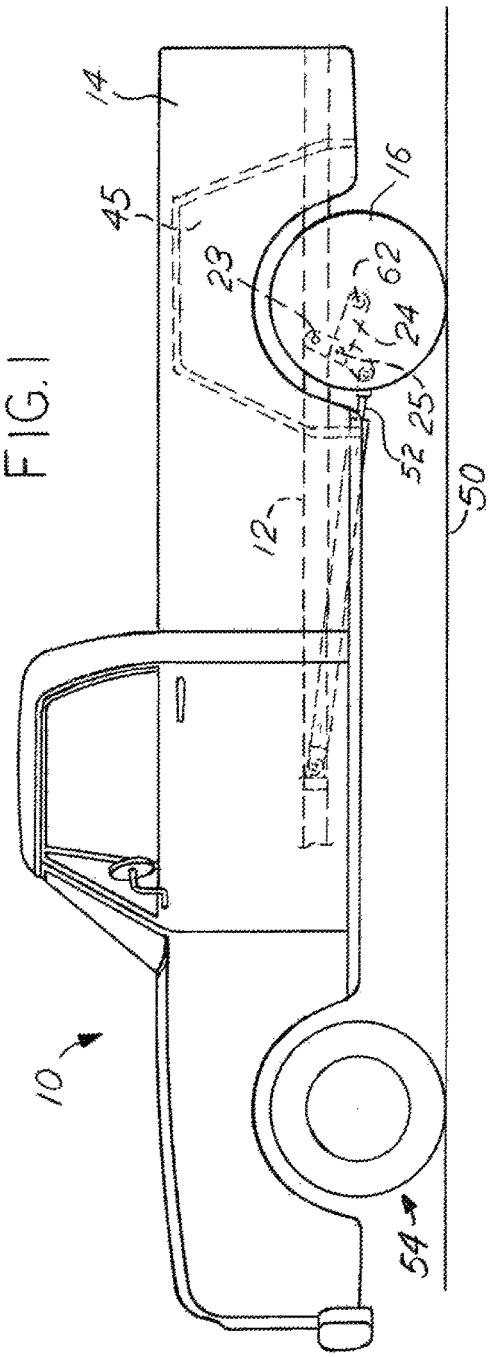
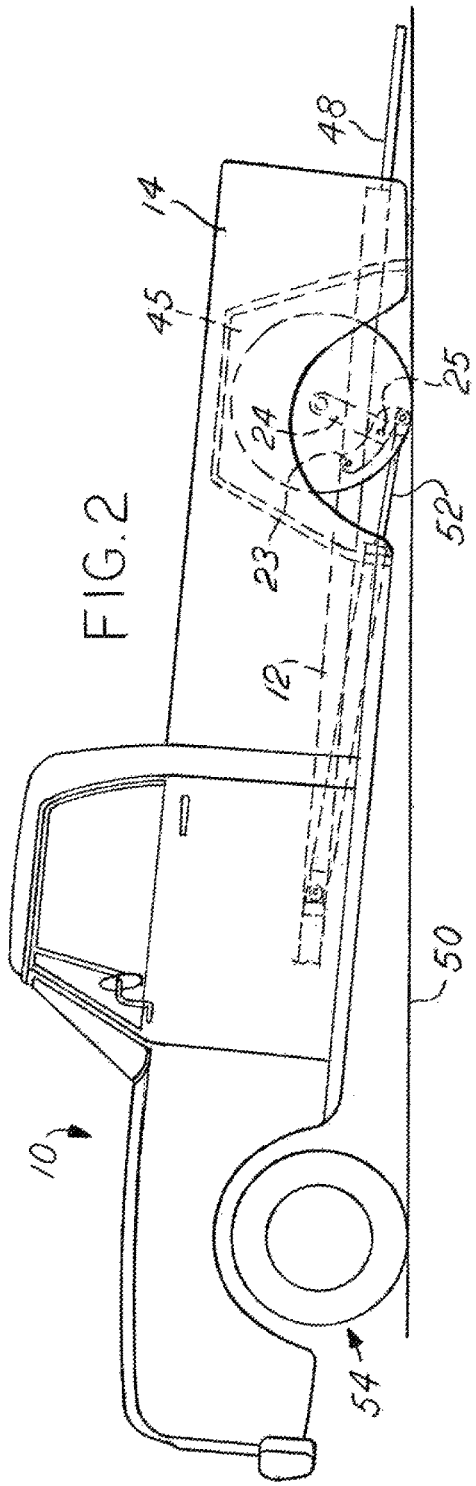

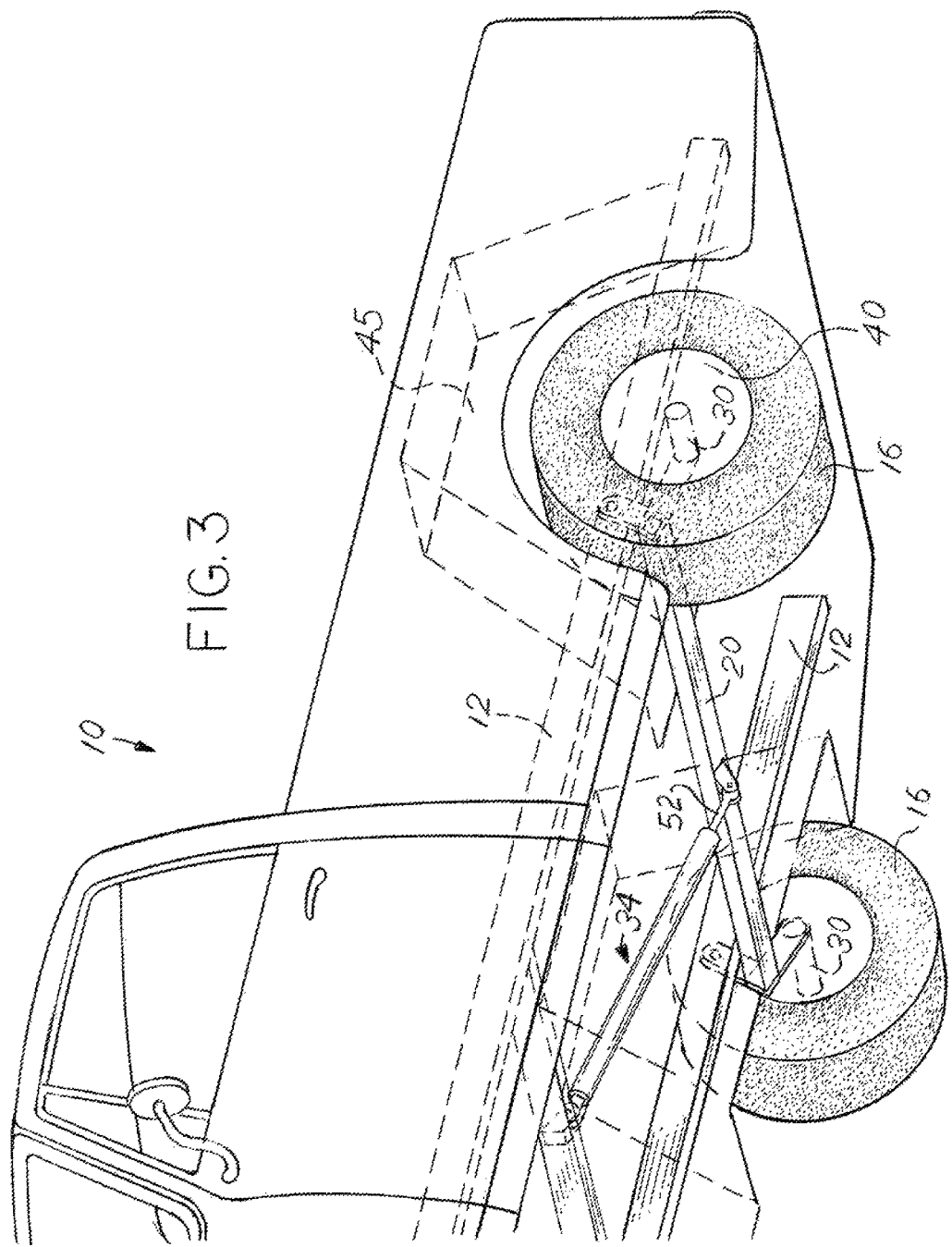

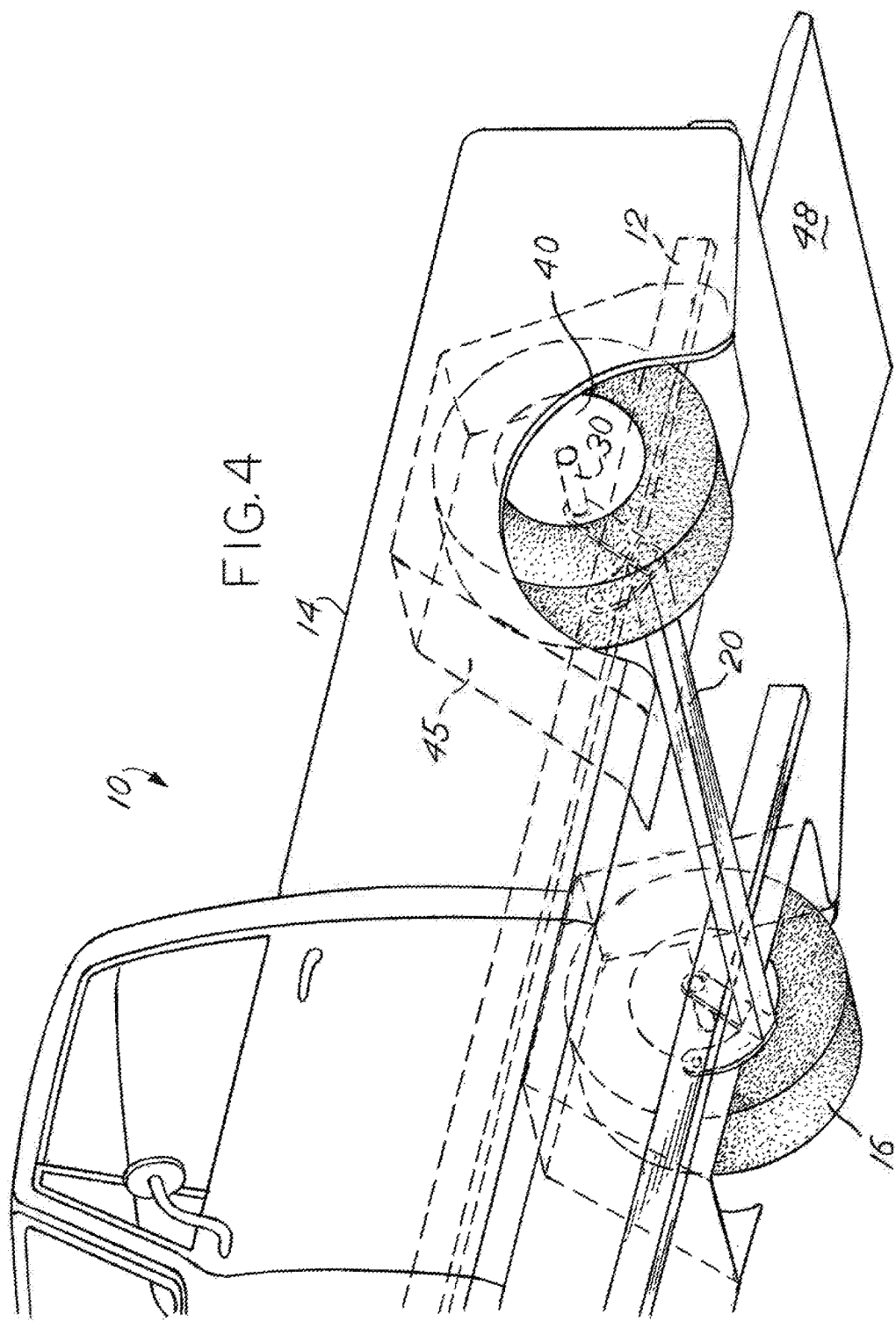

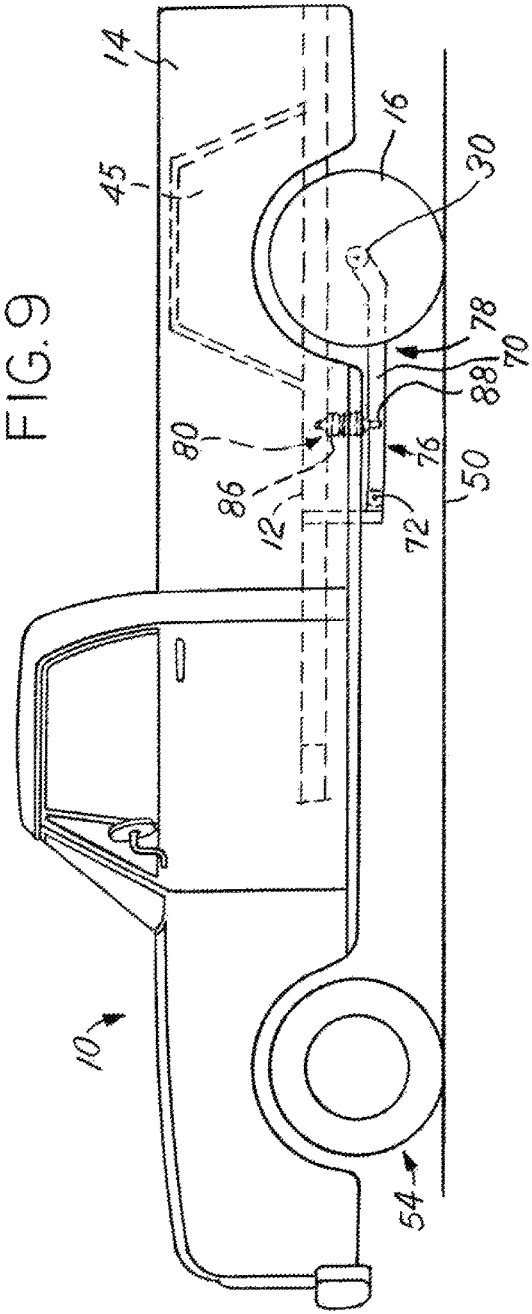
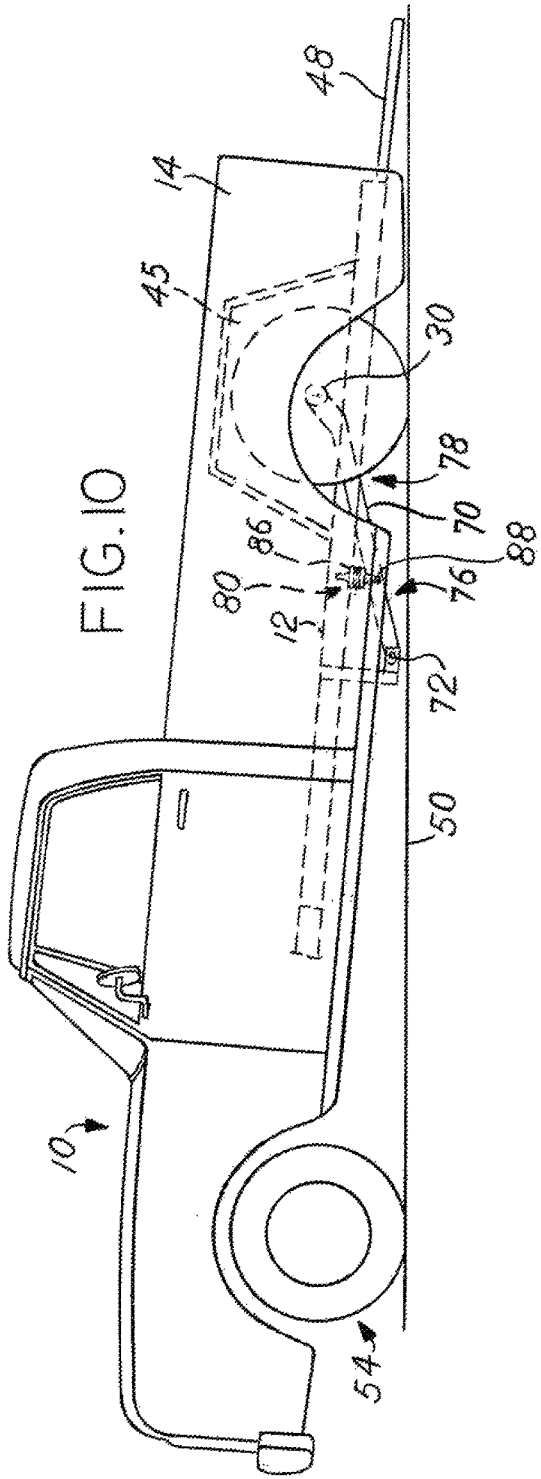

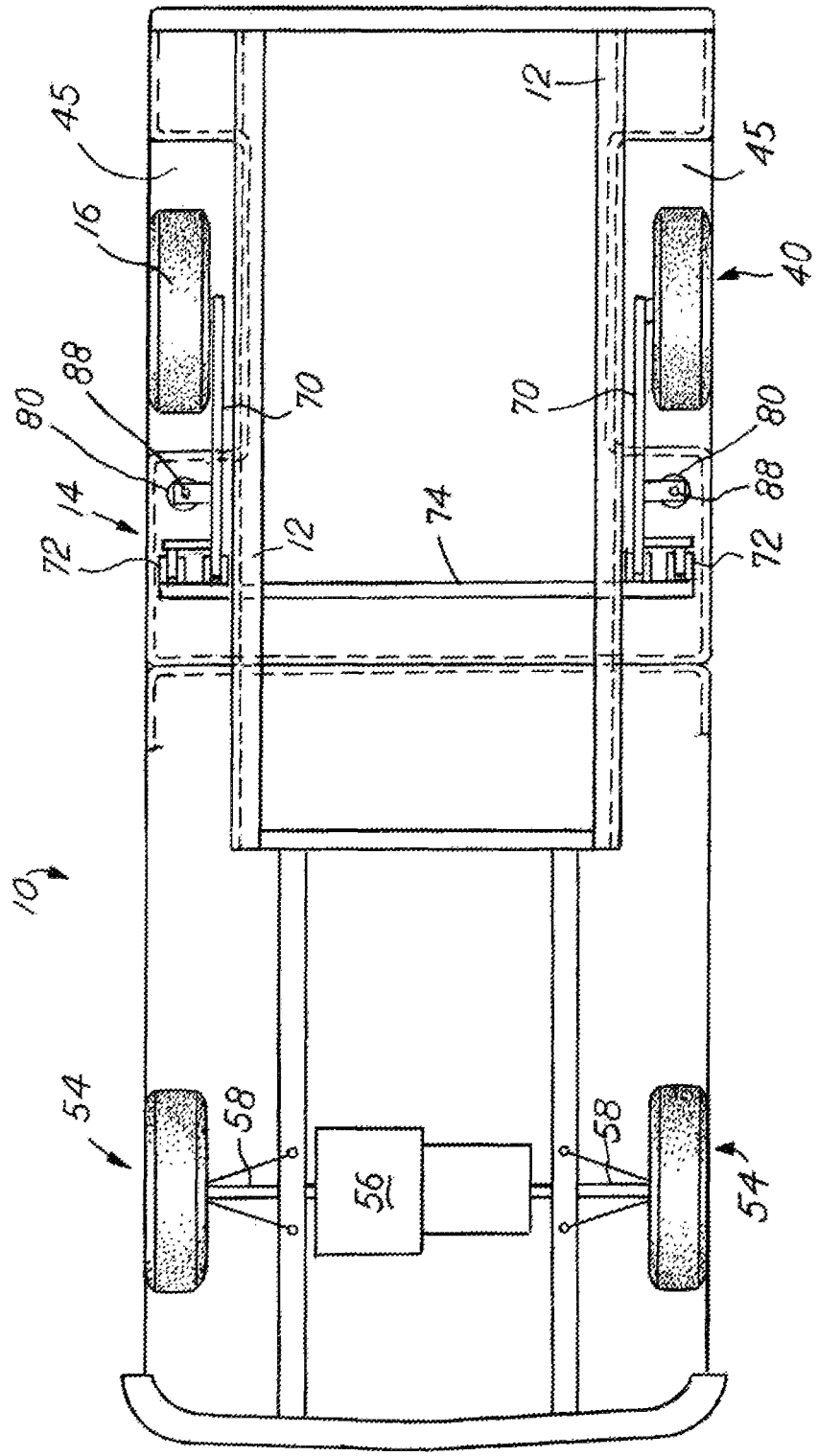

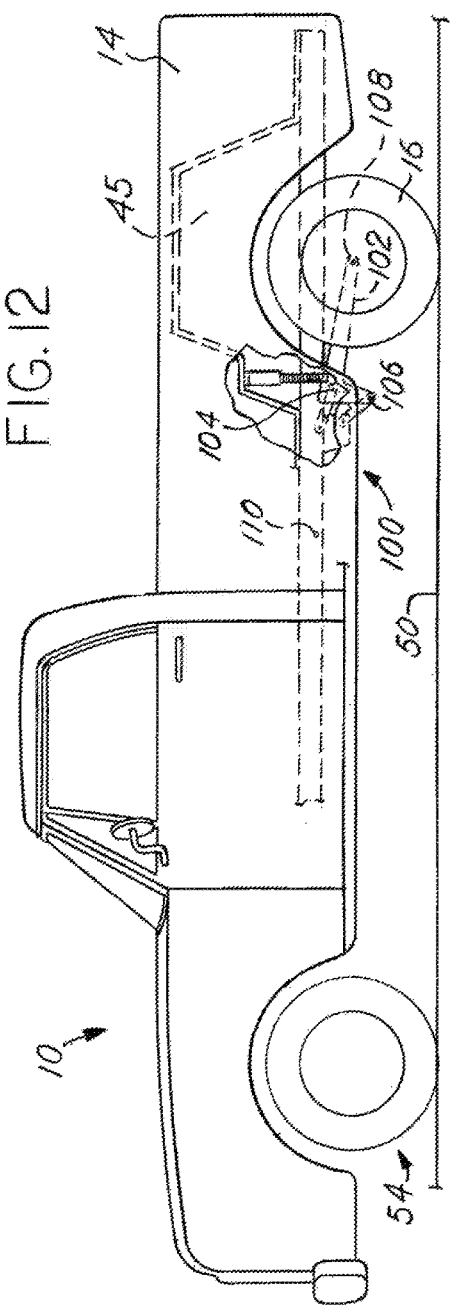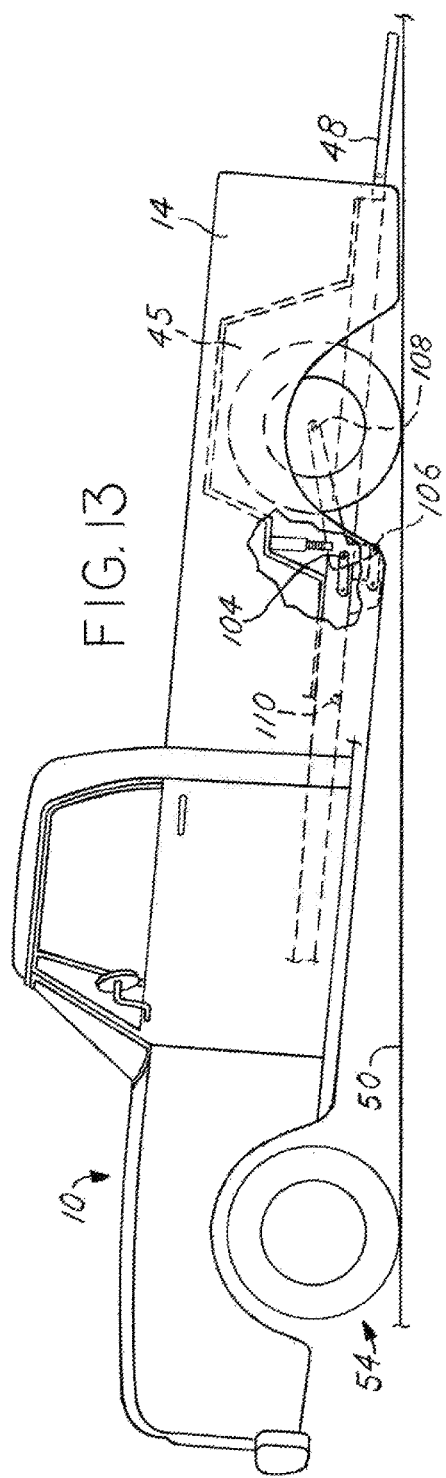

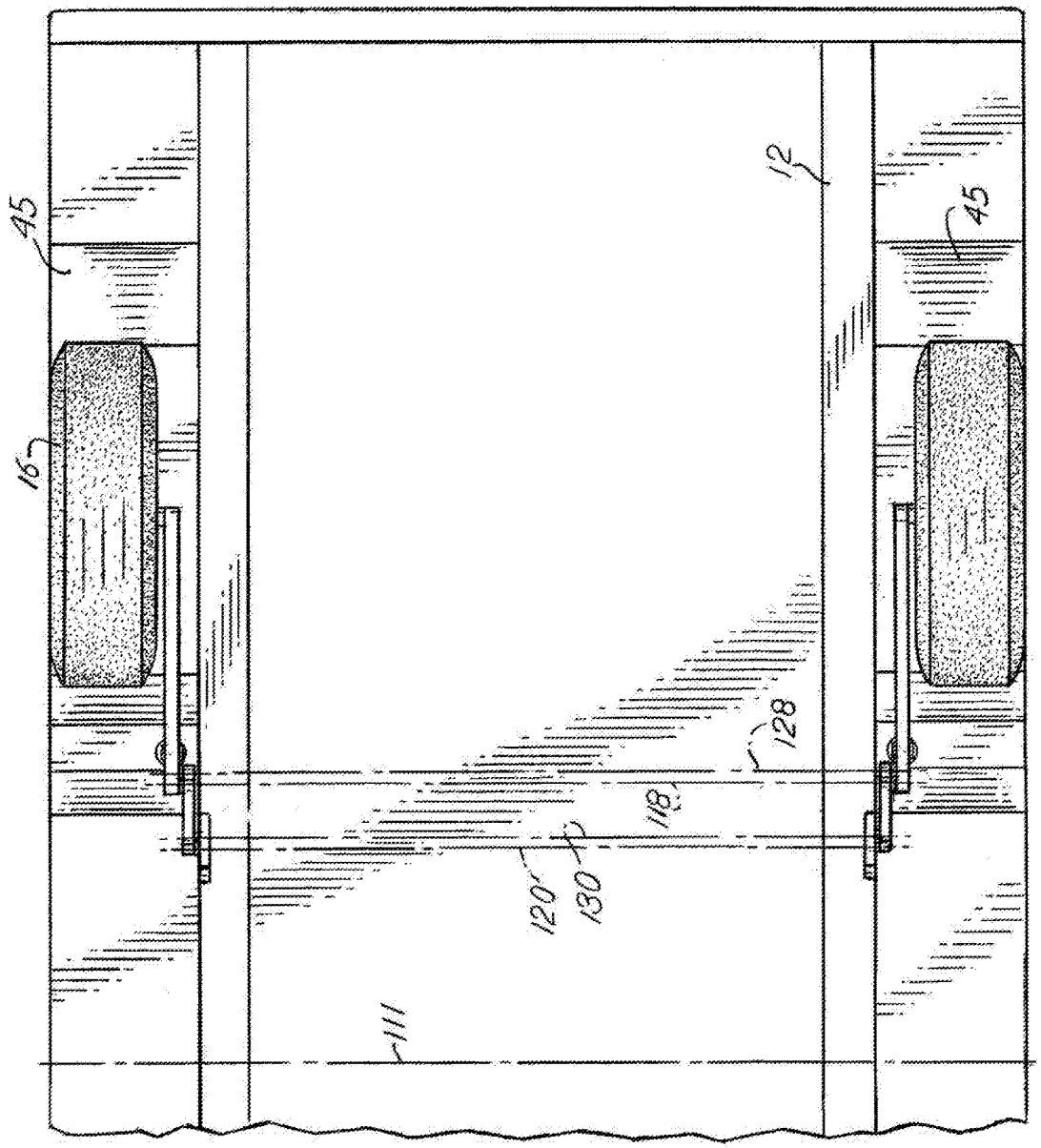

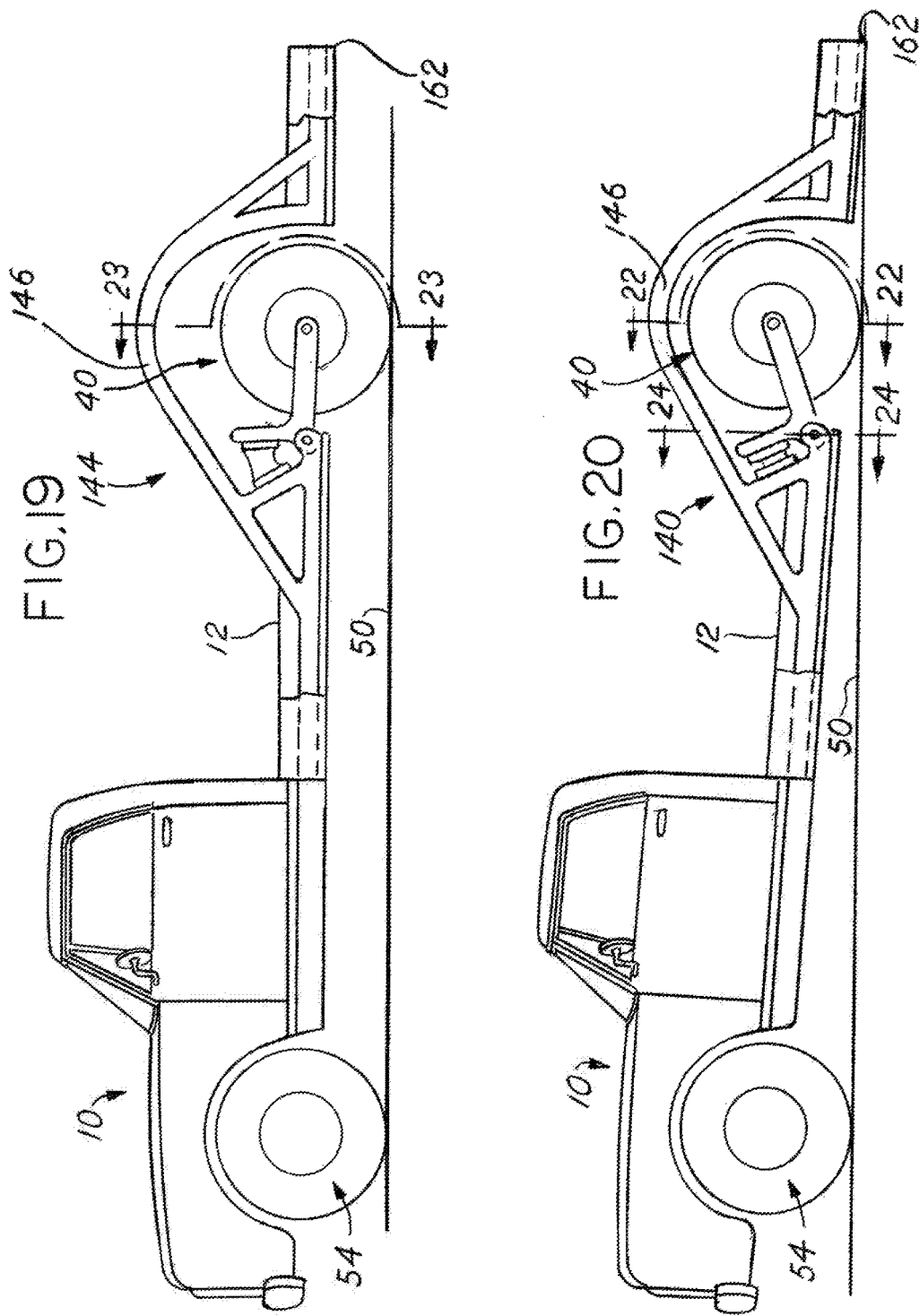

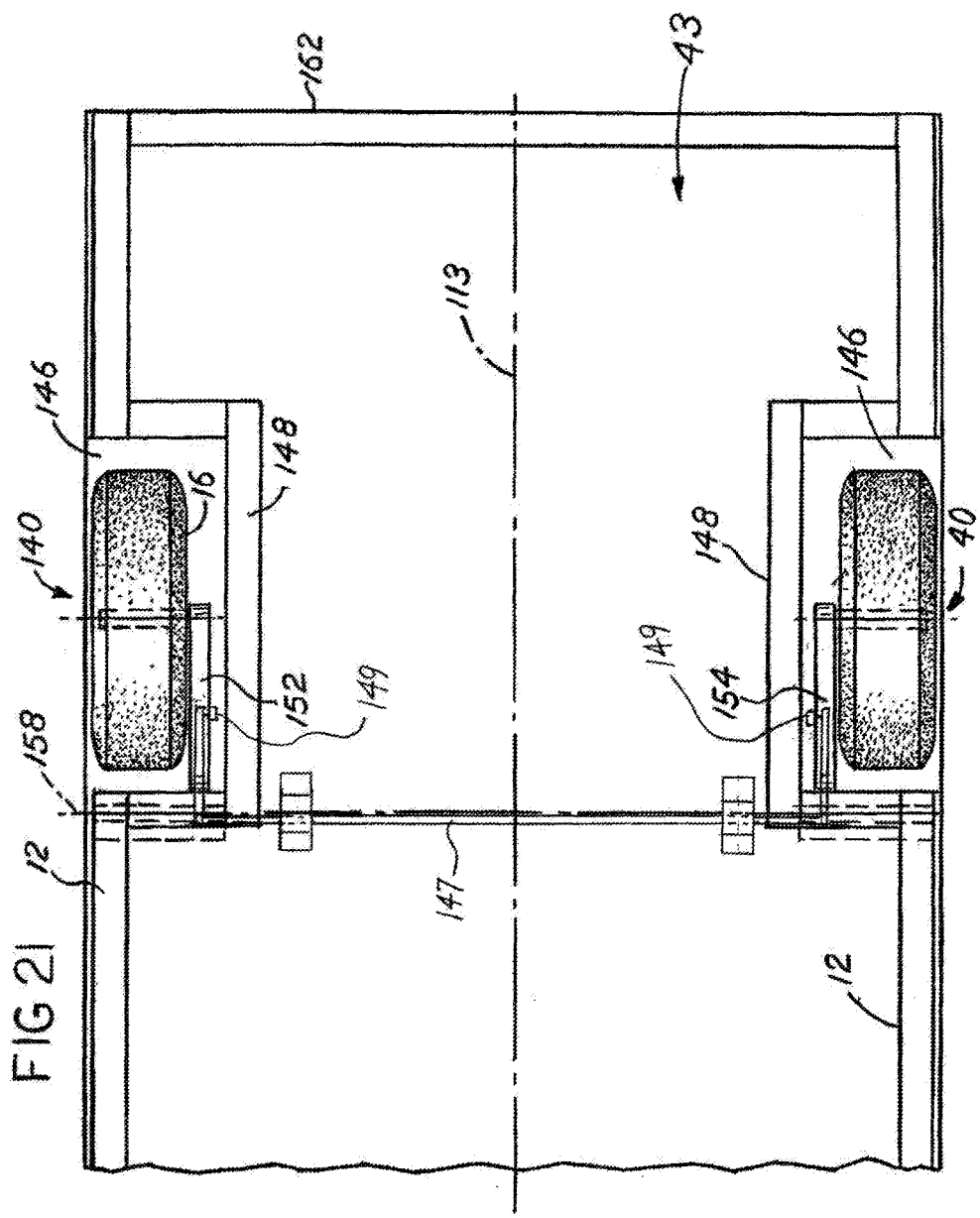

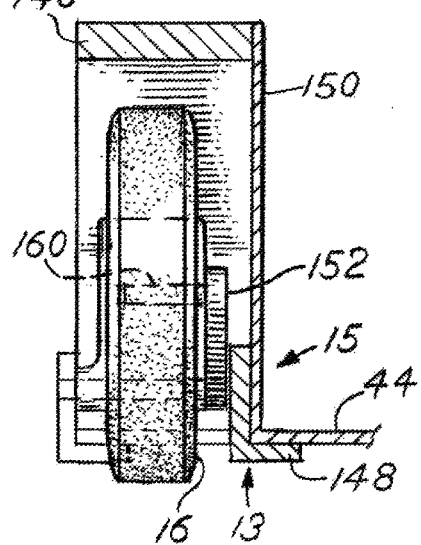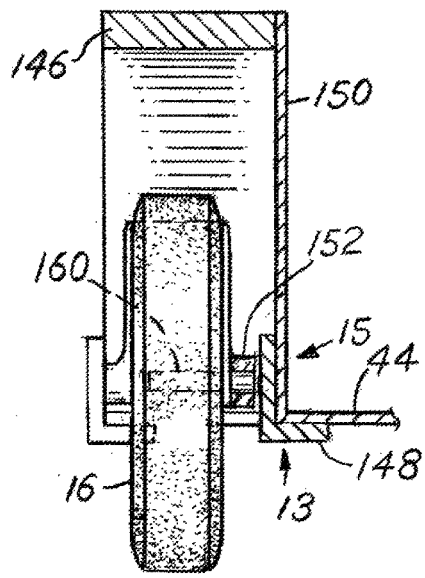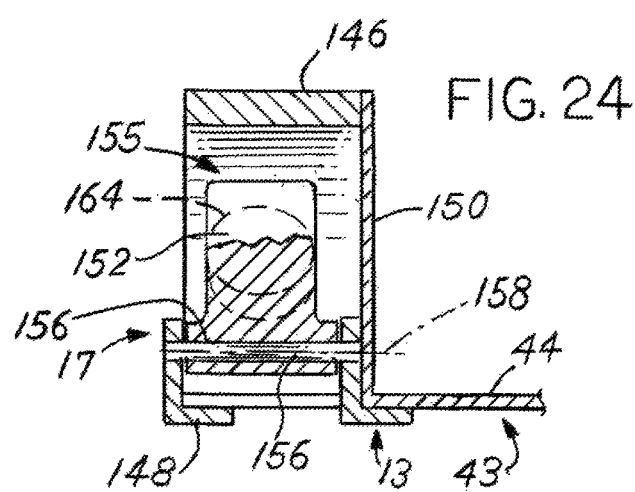

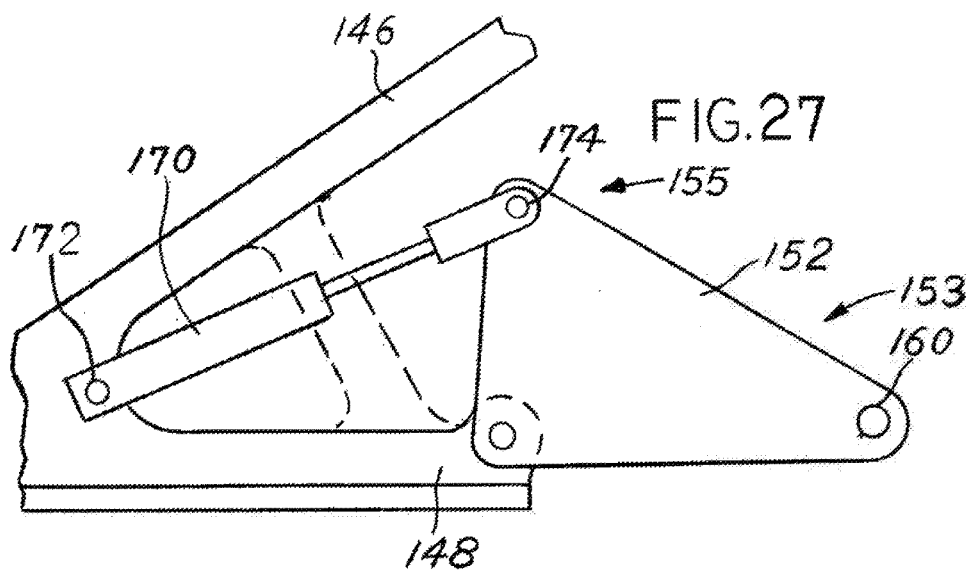
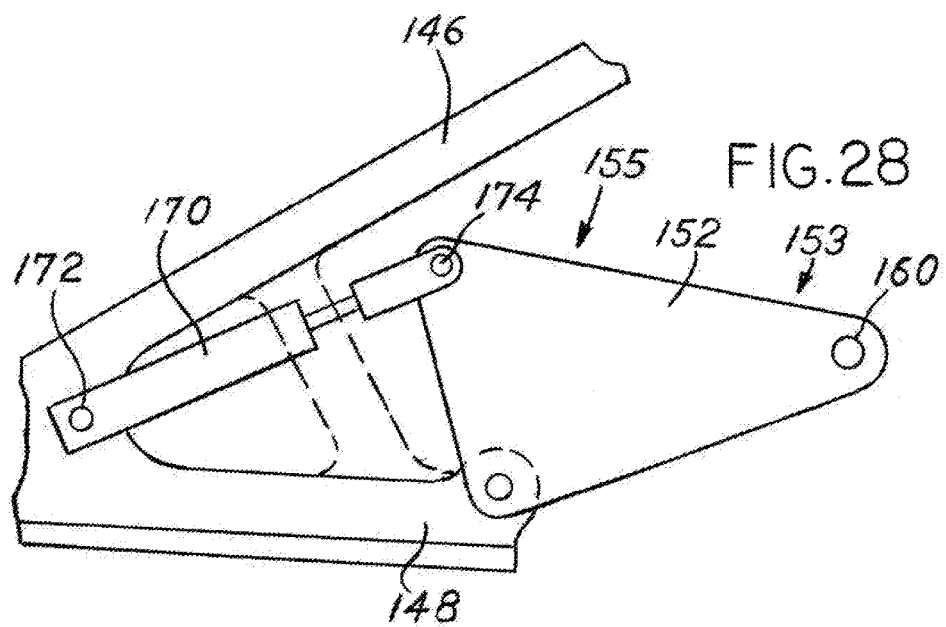

LOWERING SUSPENSION

CROSS REFERENCE TO RELATED APPLICATIONS

This application is a Continuation-in-Part of U.S. application Ser. No. 15/163,754, filed May 25, 2016, which is a Continuation-in-Part of U.S. application Ser. No. 14/581,459 filed Dec. 23, 2014, which claims the benefit of U.S. Provisional Application No. 61/621,685 filed Apr. 9, 2012, the disclosure of which is hereby incorporated by reference.

BACKGROUND OF THE INVENTION

Having a separate trailer to haul objects that are heavy often requires the use of a ramp. Having a ramp on a trailer may require a steep incline. The longer the ramp leading onto a trailer, the less steep the incline. There is a tradeoff between shorter ramps with a steep incline or longer ramps and a relatively more gradual incline. Having a longer ramp may not always be possible due to its weight, or the lack of space to store such a ramp. Ideally, the towing vehicle could be lowered near the ground to eliminate the need for a separate trailer having a ramp. Vehicles are available that have adjustable height suspension systems, usually in the form of bladders that are inflated to raise the vehicle's suspension, but these systems have serious limitations in the amount of lowering and the height the cargo must reach in order to clear the suspension. For example, the amount of travel that these systems provide is insufficient to lower one end of the vehicle to the ground. Commonly available suspension systems for vehicles are physically limited in travel due to clearance issues between driveline members and the vehicle body. An improved vehicle lowering system is needed.

SUMMARY OF THE INVENTION

The present disclosure describes a suspension system that allows one end of a vehicle to raise or lower on command. The lowered position allows the user to load the vehicle, usually a pickup bed or other flat cargo surface, by rolling, sliding, or carrying the payload up a gradual ramp that is generated by one end of the vehicle being lowered significantly. Ideally, the edge of the cargo surface would touch or nearly touch the ground at the lowest position. Once the vehicle was loaded or unloaded, the suspension could be returned to the raised position in order to create enough ground clearance to safely drive the vehicle. Various ways to implement the suspension are discussed in this application. For example, one embodiment uses a common axle that pivots about a point that intersects the frame rails. The common axle has swing arms attached thereto to provide a movable suspension. The common axle is moved between the raised and lowered position with a single actuator affixed to the axle and the frame. A second type of suspension uses individual actuators that move each side of the suspension between the raised and lowered position. A variant of the second type utilizes an upper and lower link that allow a movable arm to pivot about a point that is offset from any of the moving parts of the suspension. This type of vehicle would have a lower payload platform, resulting in a lower center of gravity and increased safety. Another embodiment uses individual pivot arms with pivot points located on a common axis that is located above the cargo surface. The individual pivot arms have corresponding actuators that are attached between the vehicle frame and the pivot arms. The frame is split into two portions where the pivot arms are attached to the frame. The upper portion extends over the wheels and the lower portion extends next to the wheels. The two portions provide structural support for the cargo surface between the wheels and a trailing edge of the cargo surface.

BRIEF DESCRIPTION OF THE DRAWINGS

A preferred embodiment of this invention has been chosen wherein:

FIG. 1 is a side view of a pickup in its raised driving position;

FIG. 2 is a side view of the pickup in FIG. 1 in its lowered position;

FIG. 3 is a perspective view of the suspension shown in FIG. 1;

FIG. 4 is a perspective view of the suspension shown in FIG. 2;

FIG. 9 is a side view of an alternate embodiment in the driving position;

FIG. 10 is a side view of the embodiment of FIG. 9 in the lowered position;

FIG. 11 is a bottom view of the embodiment of FIG. 9;

FIG. 12 is a side view of the pickup in its raised driving position;

FIG. 13 is a side view of the pickup in FIG. 12 in its lowered position;

FIG. 14A is a partial view of the pickup in FIG. 14;

FIG. 19 is a side view of the lowering suspension in FIG. 18 in the raised position;

FIG. 20 is a side view of the lowering suspension in FIG. 18 in the lowered position 18;

FIG. 21 bottom view of the lowering suspension in FIG. 18 including an optional sway bar;

FIG. 22 is a section view 22-22 of the lowering suspension in FIG. 20;

FIG. 23 is a partial view 23 of the suspension in FIG. 19;

FIG. 24 is a partial view 24 of the suspension in FIG. 20;

FIG. 27 is a view of the suspension in FIG. 25 using a cylinder actuator with the arm in its raised position; and FIG. 28 is a view of the suspension in FIG. 26 using a cylinder actuator with the arm in its lowered position.

DESCRIPTION OF THE PREFERRED EMBODIMENT

Figure 5:
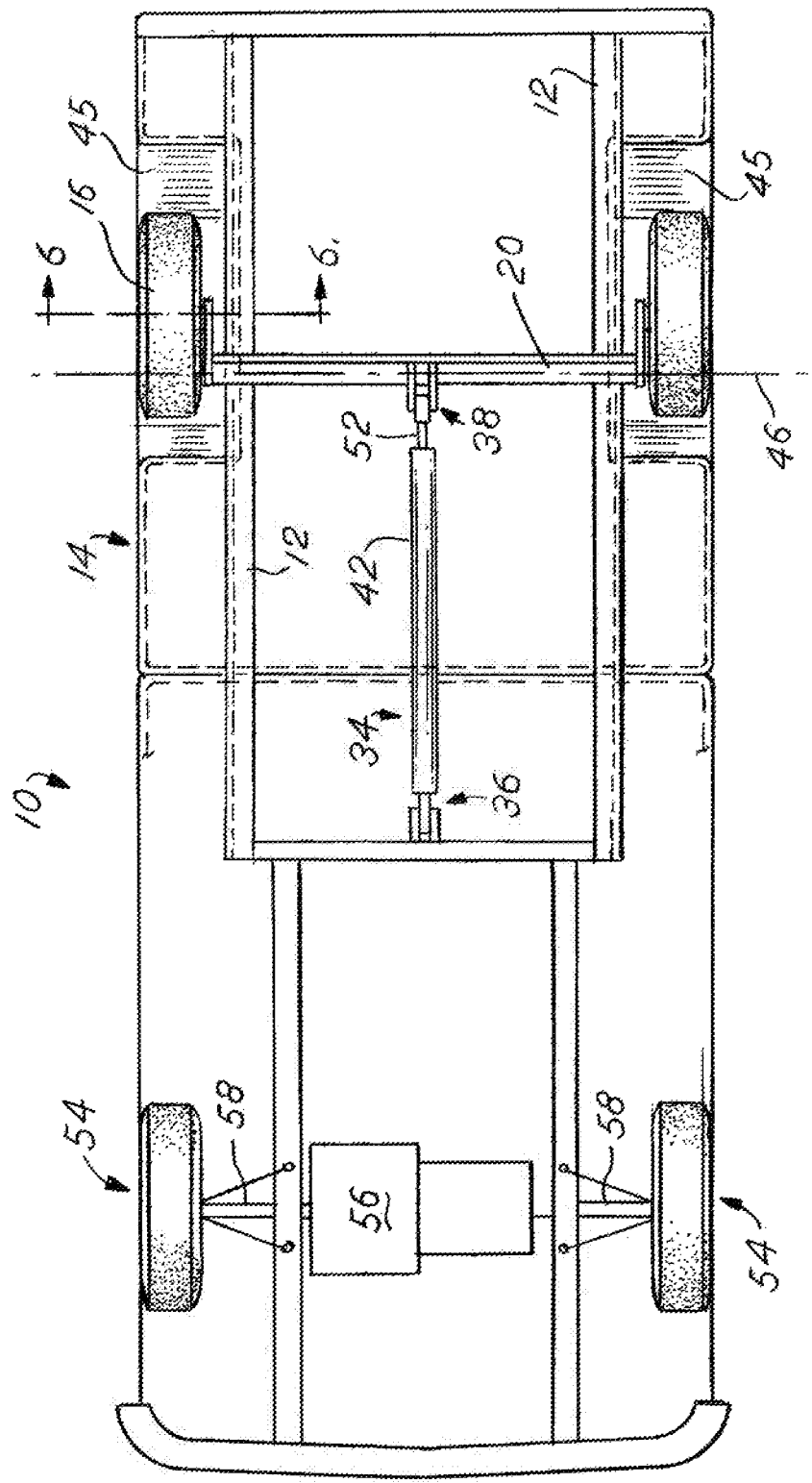
FIG. 5 is a bottom view of the pickup in FIG. 1.

The present invention is a vehicle 10 that has a system for lowering itself so that no separate ramp or lifting mechanism is necessary for loading or unloading a payload. In this case, a pickup has been used to illustrate the invention. A longitudinal axis 113 extends from the front of the vehicle to the rear and is centered between the left side and right side. A vertical plane intersects the longitudinal axis 113. However, the vehicle 10 could be a van, flatbed truck, or other vehicle that would benefit from a portion being lowered to the ground 50 as is shown in FIG. 2. The vehicle 10 of the present invention has a conventional body that is indistinguishable from any other pickup. As is typical, the vehicle 10 has a frame 12 that runs along the undercarriage. However, trucks typically have a body-on-frame construction. The frame could be integral to the body, commonly referred to as a unibody to those skilled in the art. The frame 12 runs under a bed 14 or a cargo surface 44, FIG. 6 and is L-shaped with a horizontal portion 26 and a vertical portion 18. FIG. 1 shows the vehicle 10 with the front wheels 54 and a rear wheel 40 shown in dotted lines to indicate its position. Located underneath the cargo surface 44 is an axle 20. Axle 20 as shown in FIGS. 3 and 4 is a straight tube but can have other shapes. The axle 20 has a central axis 46, FIGS. 5 and 7. Arms 22 extend outwardly from the central axis 46 and are connected to the frame 12 and pivot about pivot point 23, FIGS. 1, 2 and 7, and welded near ends of the axle 20. Two or more pivot points line up to define a pivot axis 32. The pivot axis 32 is above the cargo surface 44. The pivot point 23 can be located inboard of the frame 12 where it protrudes upward through the cargo surface 44 or be located outboard of the frame 12 as shown in FIG. 7.

Figure 7:
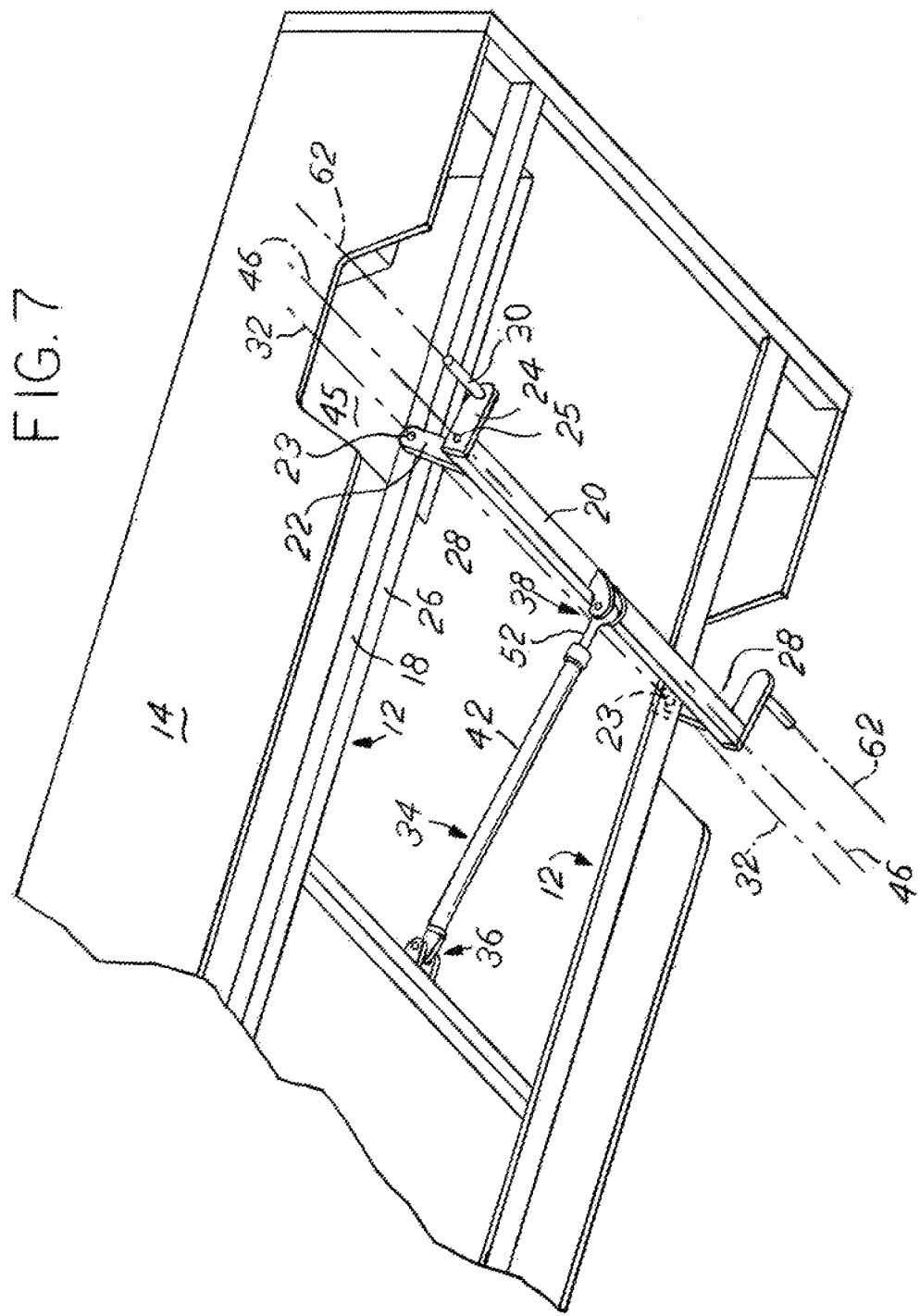
FIG. 7 is a perspective bottom view of the pickup in FIG. 2.
Figure 8:
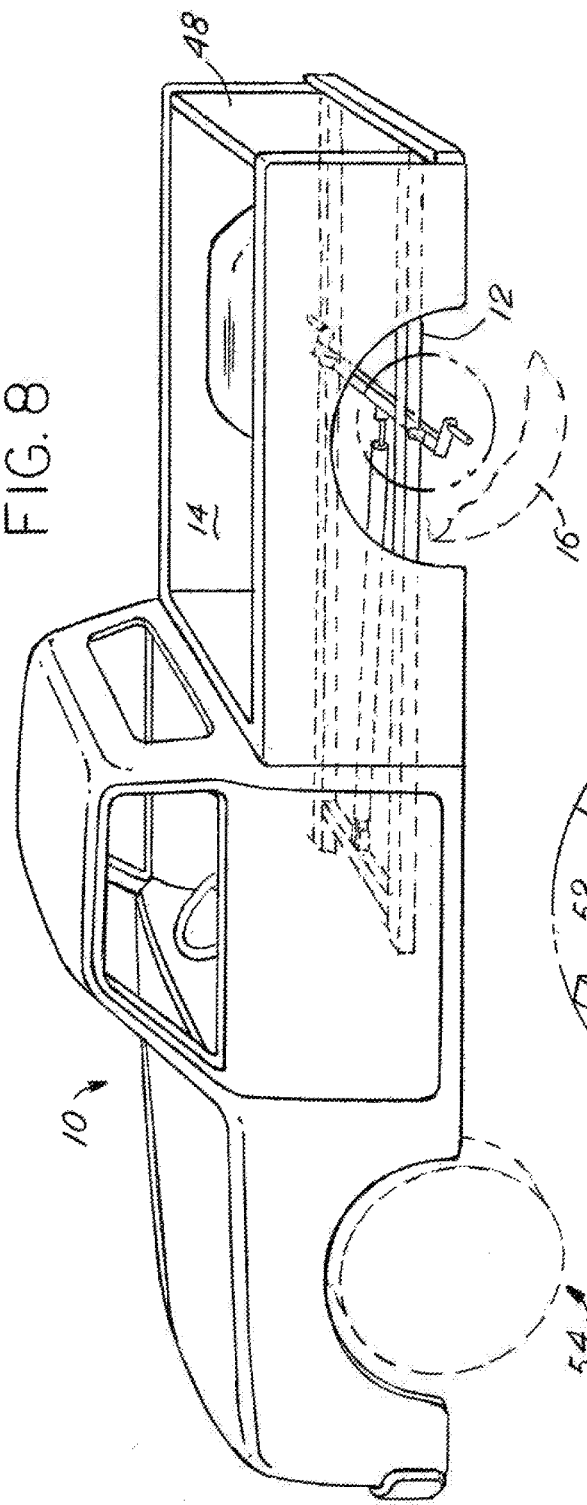
FIG. 8 is a perspective view of the pickup shown in FIG. 1.
Figure 8A:
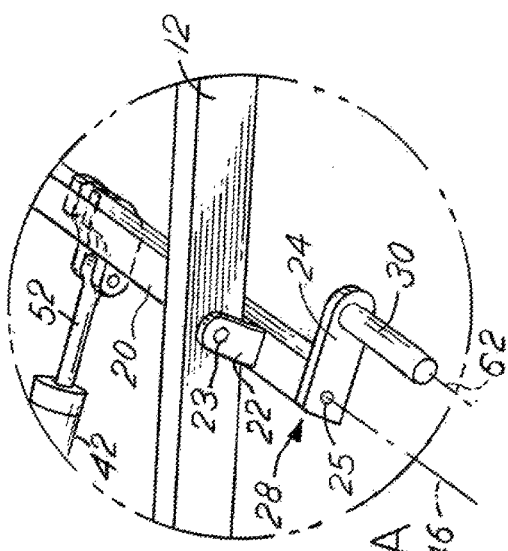
FIG. 8A is a partial view of FIG. 8.

The axle 20 may include swing arms 24 that pivot about point 25 FIGS. 1, 2 and 7, which correspond with the central axis 46 of the axle 20. The swing arms 24 extend rearward of the axle 20 as shown in FIGS. 1 and 2, but can face forward and still function the same. The swing arms 24 are part of a torsion axle as commonly known in the art. The axle 20, combined with the swing arms 24, forms a standard torsion axle. The swing arms 24 resist torsional movement about the pivot point 25 that is near the terminal end 28 of the axle 20. The swing arms 24 are shown in an unloaded position in FIGS. 1, 7 and 8A. As the swing arm 24 supports weight and the torsion spring begins to twist, the swing arm 24 rotates about the central axis 46 of the axle 20 as shown in FIG. 7. At the end of the swing arms 24, spindles 30 are attached and spaced from the pivot point 25, FIG. 8A. The spacing of the spindle 30 from the first end 28 forms a swing arm 24 suspension. As shown in FIG. 7, the spindle 30 has a spindle axis 62 that is parallel to the central axis 46 of the axle 20. As each swing arm 24 has its own torsion spring, each is allowed to move independently of the other. The independent nature of the suspension assures good contact of the vehicle 10 to the ground 50 when parked or moving over uneven ground. Independent swing arm suspension is commonly known in the art. Wheels 40, with tires 16, rotate about the spindle axis 62, FIG. 7 and are supported by bearings as is commonly known in the art. However, those skilled in the art could reverse the direction at which the swing arms 24 extend from axle 20 and the suspension would still function as a torsional suspension. It is also possible to use alternative suspension instead of a swing arm.

A cylinder 34 has a body 42 with a first end 36 that is connected to a point forward of the axle 20 to the underside of the vehicle, FIG. 7. The first end 36 is attached to the vehicle with a pin and clevis connection so that it may pivot about its first end 36. The cylinder 34 also has a movable shaft 52 with a second end 38 that is connected to the axle 20 near its midpoint. Internal to the body 42 and affixed to the shaft 52 is a piston. Fluid displacement on both sides of the piston moves the piston and therefore the shaft 52. The second end 38 is connected with a pin and clevis connection. The shaft 52 is movable between a retracted position and an extended position. The retracted position is shown in FIGS. 1 and 3. The extended position of the cylinder 34 is shown in FIGS. 2 and 4. The cylinder 34 could be pneumatic, electric, or hydraulic. When the cylinder 34 is in its retracted position, the rear wheels 40 of the vehicle 10 will be in the position in which the vehicle will be driven, corresponding to a normal ride height. When in the retracted position, cylinder 34 and the vehicle will take advantage of the torsional suspension and the wheels will pivot about point 25 and act as an ordinary trailing arm torsional suspension. It is possible to locate the cylinder on the opposite side of the axle, where the extended position causes the vehicle to raise and the retracted position causes the vehicle to lower. The spindles 30 will be below the frame 12 as is typical due to the necessary ground clearance. When in the extended position, cylinder 34 and the vehicle will be in the lowered position as shown in FIGS. 2 and 4. In this position, the spindles 30 will be above the lowermost portion of the frame 12 and the cargo surface 44.

The separate swing arms 24 make it possible for the spindles 30 and thus the centers of the wheels 40 to be above the frame 12 because there is not an axle running directly in line with the spindles 30. The spindle 30 is located below the cargo surface 44 when the vehicle is in the driving position as is shown in FIGS. 1 and 3. When the vehicle is moving in reverse, the wheels 40 may encounter resistance. The resistance could create compression force on the cylinder 34, which is normally in compression. A cable or other lifting means could cause the axle to move unexpectedly, while the cylinder requires positive displacement to move the axle. The cylinder can provide force in tension or compression, unlike a cable or pulley system.

The axle 20 or cylinder 34 could have a lock to prevent movement of the axle 20 when the vehicle is in the driving position. In the event that stops are not present, failure of the cylinder could result in the vehicle lowering unintentionally. For safety or service, it is possible to instead add a lock to arms 22 or axle 20 in either the driving or loading position. Locking the lever arms 22 in the driving position prevents braking, acceleration, or the weight of the vehicle from being transmitted to the cylinder 34. Additionally, the addition of a lock allows the vehicle 10 to be secured for service of the system or any other part of the vehicle that would require immobilization of the lowering system.

The axle 20 provides adequate ground clearance to the cargo surface 44 when lowered and the ground 50 when raised. The wheels 40 when they are in the position shown in FIGS. 2 and 4, are retracted into wheel wells 45. Because the spindles 30 can be above the frame 12, the cargo surface 44 of the bed 14 can be as low as the bottom portion 26 FIGS. 6 and 7 of the frame 12 if necessary, as shown in FIG. 7. The configuration of the present invention allows for a significantly lower bed than would be possible if a typical rear wheel drive train were located between the wheels 40.

Because the axle 20, as shown in the embodiment, is not connected to a transmission in the vehicle 10, it cannot provide standard propulsion from an engine 56. Brakes can be installed over the spindle 30 to provide stopping force. It is also possible to integrate an electric motor on the spindle 30 such that electric propulsion is possible, as is commonly known in electric vehicle art. Standard propulsion from an engine 56 would be from another axle in the vehicle, such as the half shafts 58 attaching the front wheels 54 of the vehicle 10 to the power train as shown in FIG. 5.

Figure 6:
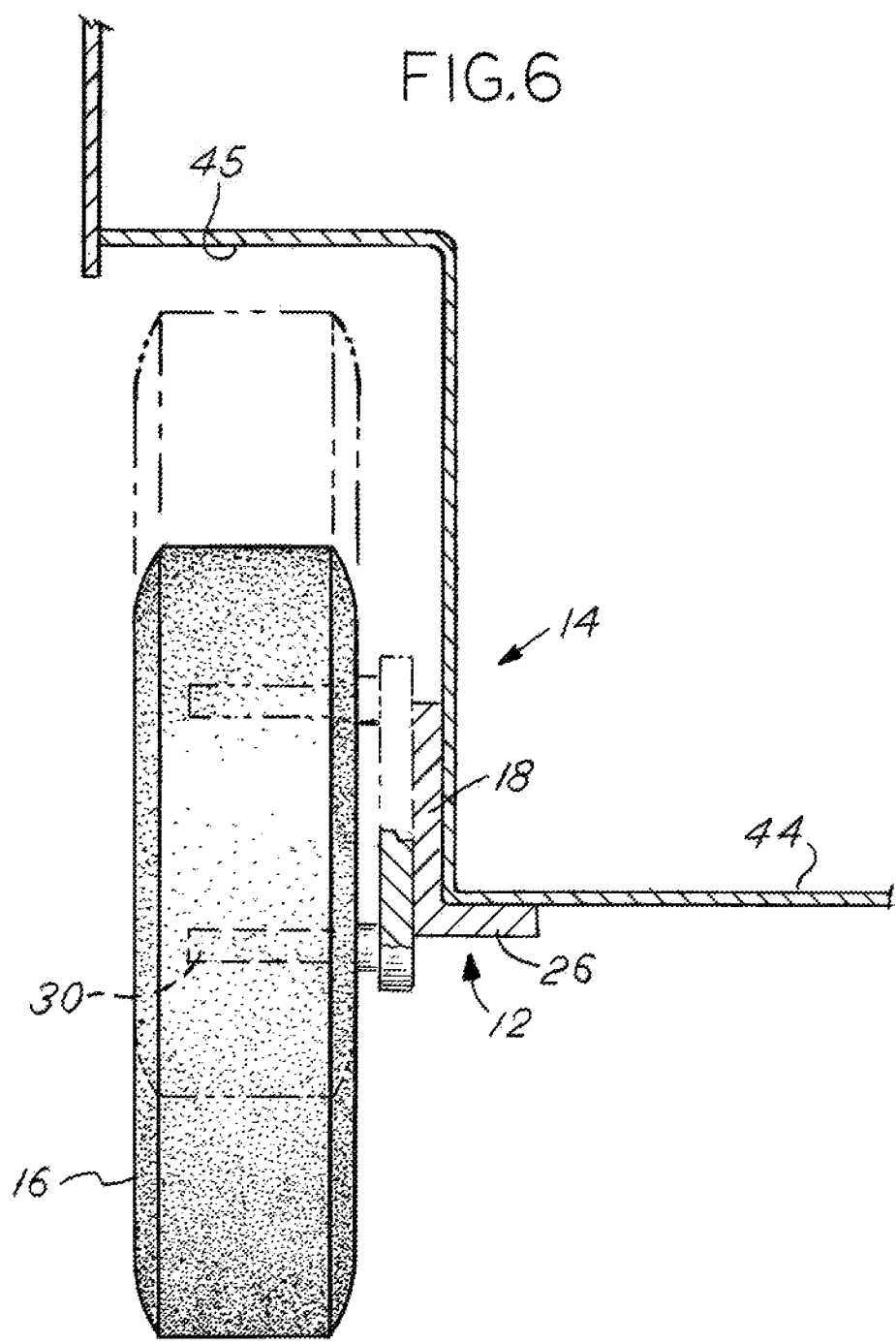
FIG. 6 is a section 6-6 of the pickup in FIG. 5 showing the raised and lowered position.

As shown in FIG. 4, the cargo surface 44, FIG. 6, may be lowered very near the ground. A tailgate 48 may be dropped as shown in FIG. 4 so that it meets the ground 50 on which the vehicle 10 rests. This forms an integral ramp that functions to retain cargo when not in use. It is also possible to locate the axle 20 and cargo surface 44 such that a tailgate is not necessary. Lowering the vehicle could bring the furthest end of the cargo surface 44 in contact with the ground.

As shown in FIGS. 9 and 10, it is possible to incorporate the suspension and lifting mechanism into one link 70. The link 70 has a first end 76 that is near a pivot point 72 where opposite sides of the vehicle are connected with an axle 74. The axle 74 ties both links together and it is contemplated that it serves as a stabilizing bar. On a second end 78, spindles 30 are attached. As shown in FIG. 9, when the vehicle 10 is in the driving position, the spindles 30 are above the cargo surface 44. When the vehicle 10 is in the lowered position, the spindles 30 are above the cargo surface 44. Instead of a single cylinder 34, the raising and lowering of the links 70 is from actuator 80. The actuator can be either pneumatic or hydraulic. As with the cylinder 34, displacement of fluid causes a piston or a diaphragm to move between the raised and lowered position. The actuator 80 is attached to the frame 12 on one end at a first end 86 and the link 70 on the second end 88. The actuator 80 can act as suspension in addition to raising and lowering the vehicle. It is contemplated that the link 70 is spring-loaded to the raised position and the actuator 80 is used to lower the vehicle. In that case, failure of the actuator would move the vehicle to the raised position.

Figure 14:
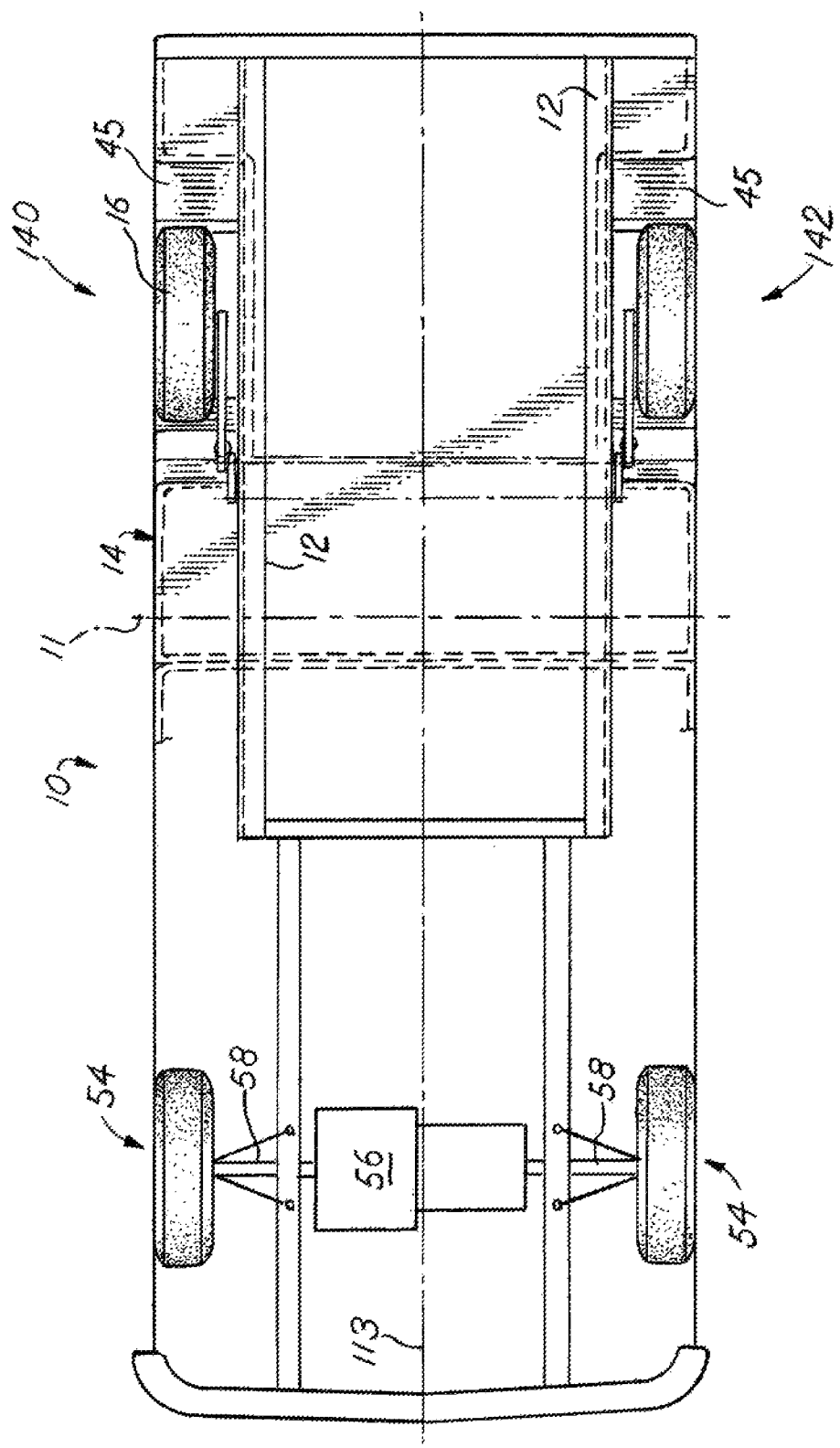
FIG. 14 is a bottom view of the pickup in FIG. 12.
Figure 15:
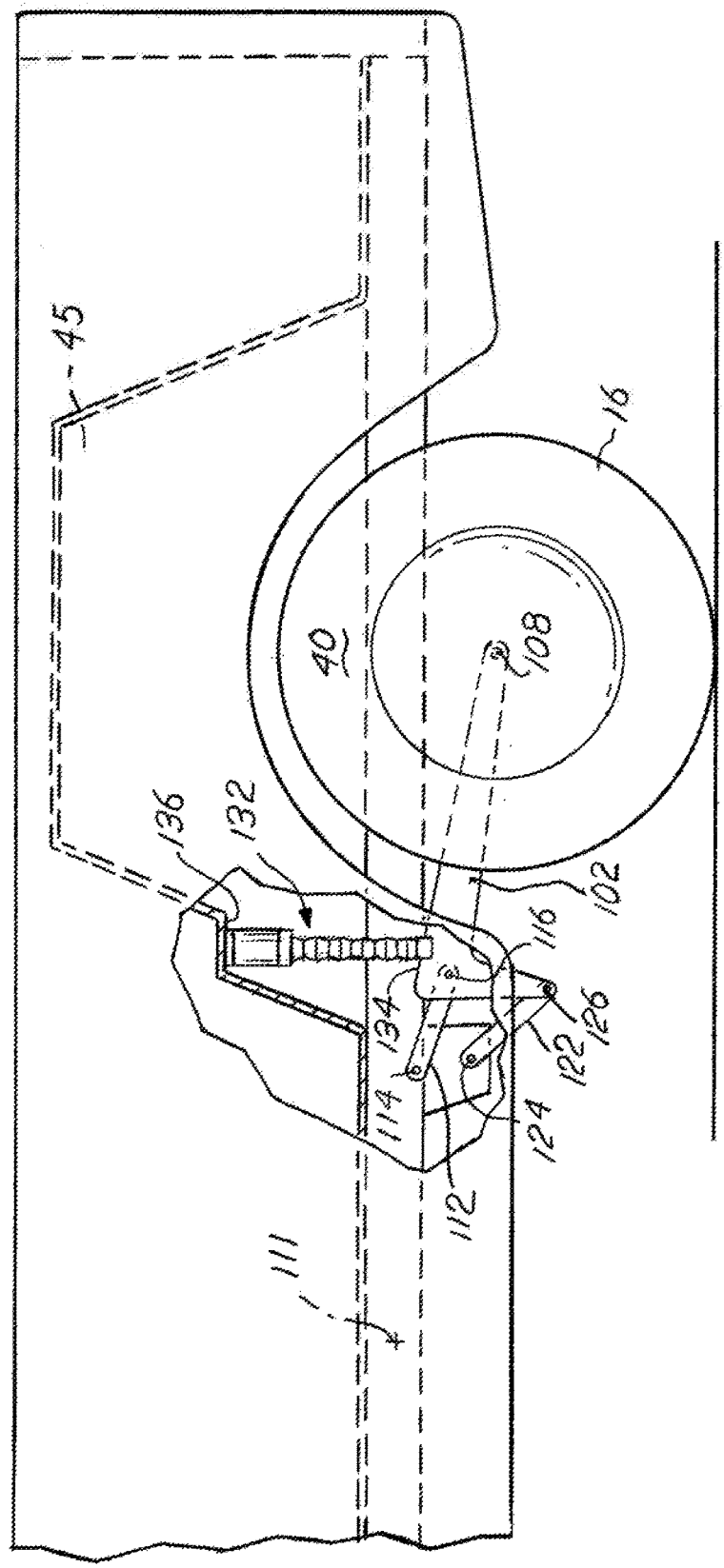
FIG. 15 is a partial view of FIG. 12.
Figure 16:
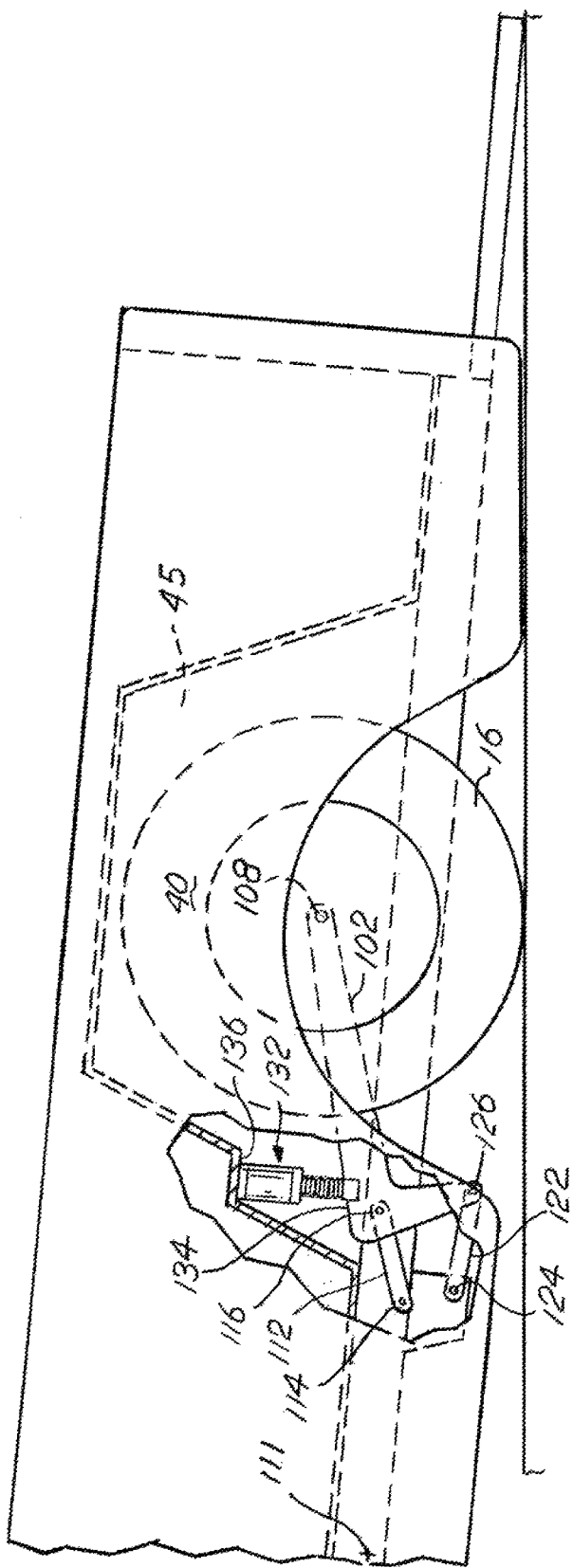
FIG. 16 is a partial view of FIG. 13.
Figure 17:
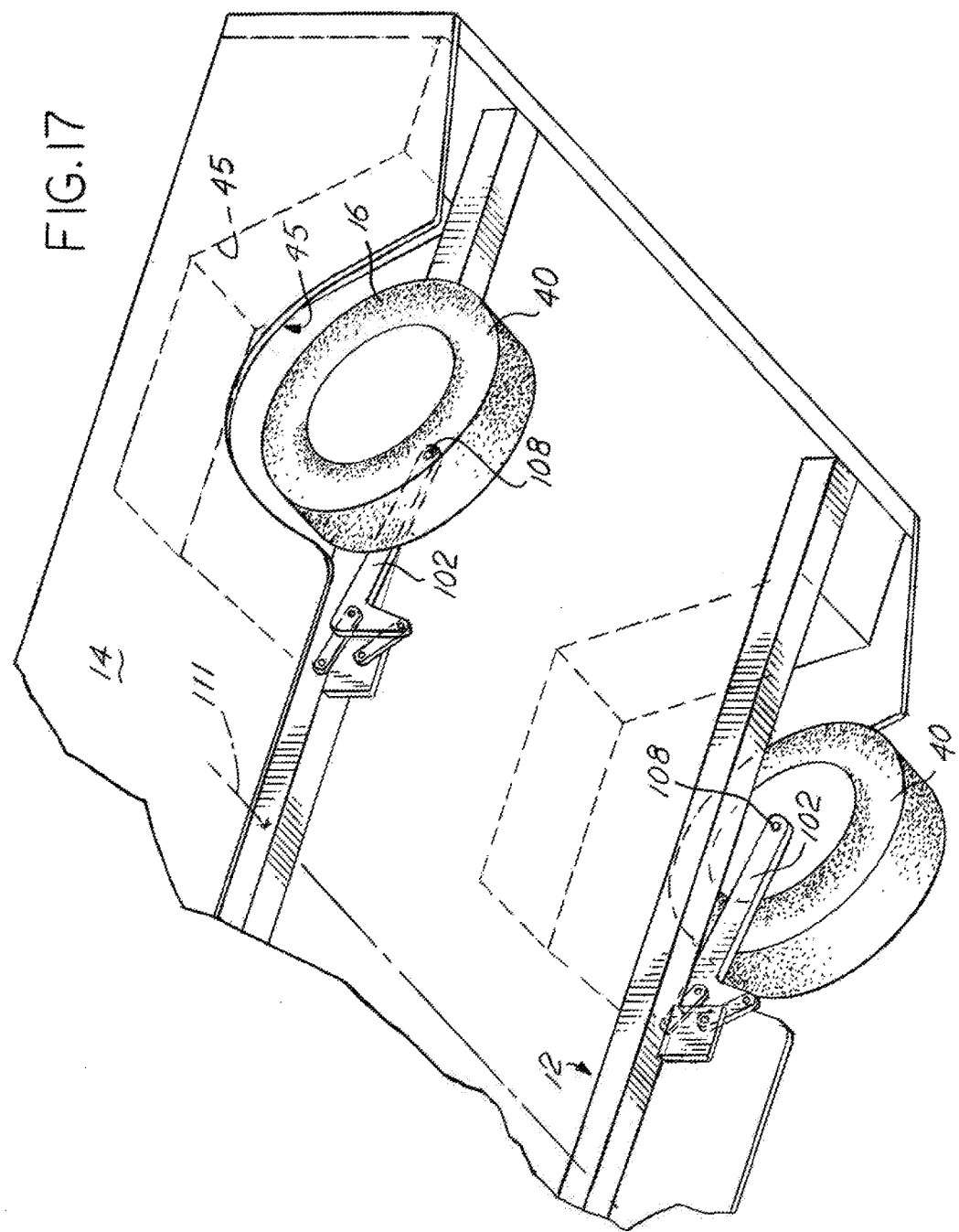
FIG. 17 is a bottom perspective view of the pickup in FIG. 12.
Figure 18:
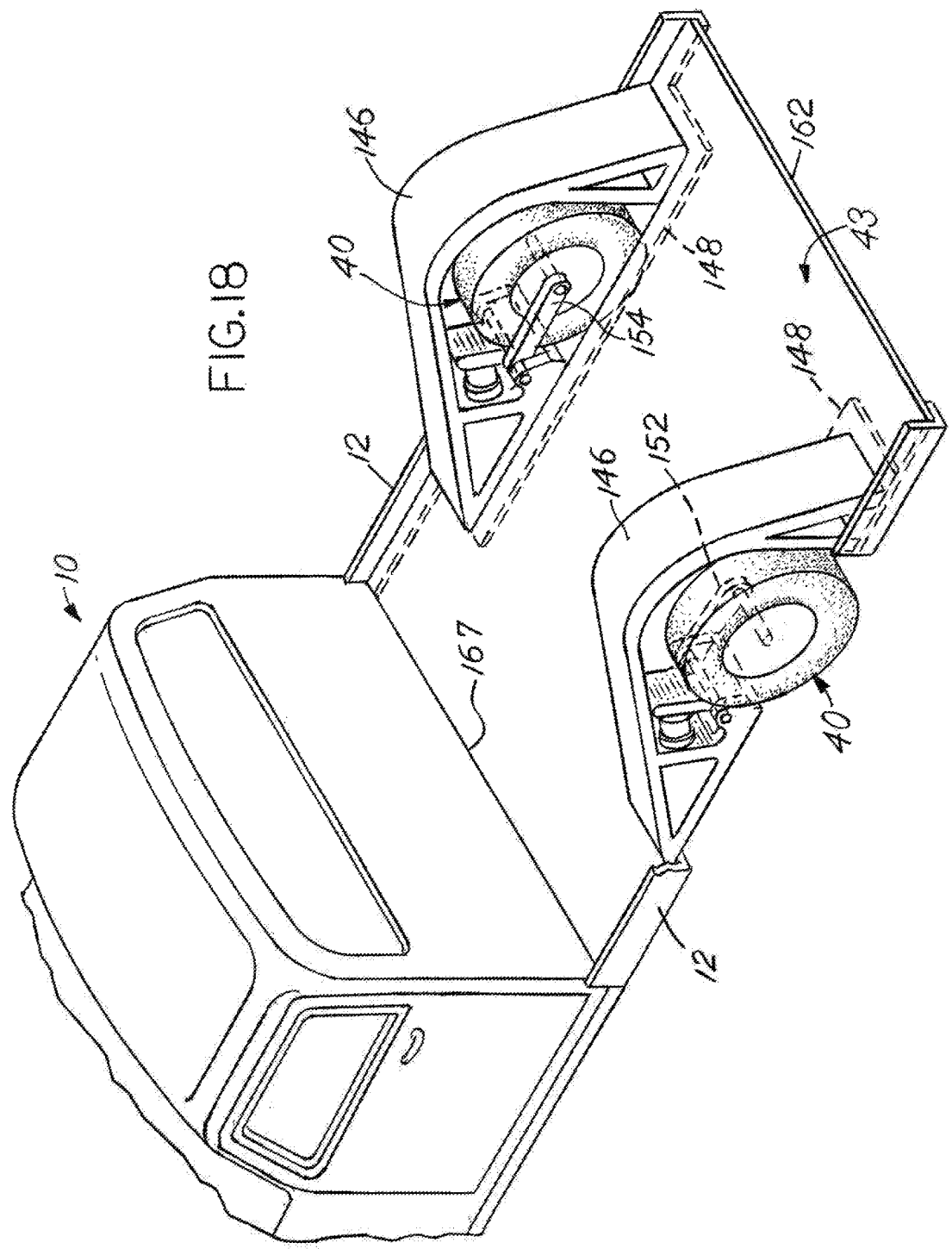
FIG. 18 is a side view of an alternate embodiment of the lowering suspension in the raised position.

An alternate embodiment of the lowering suspension 100 is shown in FIGS. 12-17. The suspension 100 is movable between a raised position as shown in FIGS. 12 and 15 and a lowered position as shown in FIGS. 13 and 16. A moving arm 102 is connected to the frame 12 at a proximal end through an upper link 112 and a lower link 122. There is a spindle 108 on a distal end of the moving arm 102 that supports the wheel 40 and tire 16 and allows them to rotate. The upper link 112 has an arm mounting end with a first pivot point 116 and a vehicle mounting end with a third pivot point 114. The upper link 112 rotates about the first pivot point 116 on an axis 118. The upper link 112 also rotates about the third pivot point 114 on another axis 120. The upper link 112 has a length defined by the distance between the first pivot point 116 and the third pivot point 114. Likewise, the lower link 122 has an arm mounting end with a second pivot point 126 and a vehicle mounting end with a fourth pivot point 124. The lower link 122 rotates about the second pivot point 126 on an axis 128. The lower link 122 also rotates about the fourth pivot point 124 on another axis 130. The first pivot point 116 is above the second pivot point 126 and both are located on the proximal end of the moving arm 102 The pivot points 116, 126 are closer to each other than either pivot point 116, 126 is to the spindle 108. The third pivot point 114 is above the fourth pivot point 124 and both are located on the frame 12 or vehicle body. The third pivot point 114 is shown as near the cargo surface 44, and it is contemplated that the pivot point is above the cargo surface 44. As shown in FIG. 16, the lower link 122 has a length defined by the distance between the second pivot point 126 and the fourth pivot point 124. The axes 118, 120, 128, 130 are shown as parallel and spaced from each other by respective distances. FIG. 14A shows the parallel spacing of the axes. Axes 118 and 126 are spaced farther from each other than axis 120 is spaced from 130, however it is contemplated that the axes have different spacing than what is shown. As shown, the links 112, 122 have lengths that are different, but it is contemplated that the link lengths are the same. The lengths of the links 112, 122 and the spacing of the axes 118, 120, 128, 130 cause the arm 102 to pivot about an instant center 110 that is offset from the suspension 100. As shown, this instant center 110 is located above the cargo surface 44 and frame 12. The instant center 110 is in different locations on the vehicle, depending on the position of the moving arm 102 between the raised and lowered positions. However, it is contemplated that the instant center 110 remains stationary between the raised and lowered positions. When the moving arm 102 moves to the lowered position, the distal end is closest to and adjacent the cargo surface 44. Depending on the lengths of the upper and lower link 112, 122 and locations of the pivot points 114, 124, 116, 126, the spindle 108 may move above the cargo surface 44 when the moving arm 102 is moved to the lowered position.

An actuator 132 has a first end 136 that is attached to the vehicle 10 or the frame 12. The opposite end 134 is attached to the moving arm 102 near the axis 118 or it is attached to one of the links 112, 122. The actuator 132 as shown is pneumatic. The actuator 132 typically is an air bag style as is used on heavy duty trucks and tractor-trailers. This is commonly called pneumatic springs and these are well known in the art. It moves from an extended position as shown in FIG. 15 to a retracted position as shown in FIG. 16. To move the actuator 132 to or from the extended position, a pump or tank moves fluid, typically air, into the actuator 132. This causes either a bellows to expand or a piston to move. A compressible fluid, such as air, gives the benefit of some level of shock absorption that absorbs surface irregularities while the vehicle is moving and allows suspension travel. As described, the actuator 132 is pneumatic but it is contemplated that the actuator is hydraulic, electric, or mechanical. As with the other embodiments of the suspension, it is contemplated that a locking device is used to fix the moving arm in the raised position, the lowered position, or any point between. It is further contemplated that the moving arm 102 is flexible in the vertical direction to allow suspension travel and shock absorption. The actuator 132 is shown affixed between the moving arm 102 and the vehicle, but the actuator 132 can be also affixed between the vehicle and one of the links 112, 122 or one of the pivot points 116, 126 on the moving arm 102. In this embodiment, the actuator would move the moving arm the same as the embodiment shown in FIGS. 15 and 16, but would exert force directly on the link 112, 122. Not shown in the FIGS, but commonly known in the art, is a braking system that is attached to the moving arm 102 around the spindle 108 that is used to slow the vehicle 10.

As shown in FIG. 14, the suspension as attached to the vehicle 10 has a left side 140 and a right side 142. The instant centers 110 between the left side 140 and the right side 142 form a pivot axis 111. As the suspension 100 moves, the instant centers 110 move, along with the pivot axis 111. The pivot axis 111 is shown as being perpendicular to a longitudinal axis 113, but the left side 140 moving with respect to the right side 142 could cause this axis 111 to be obliquely angled with respect to the longitudinal axis 113. The longitudinal axis 113 is aligned with a vertical plane.

One side 140 of the suspension is the mirror image of the other side 142. The two sides 140, 142 may be connected with a sway bar 147, as shown in FIG. 21. The sway bar 147 would pivot about an axis to couple the left side 140 to the right side 142 through end links 149 connected to their corresponding pivoting arms 152, 154. Sway bars are well known in the art to improve handling and stability. The suspension 100 is independent between the left and right side 140, 142, but it is contemplated that the sway bar 147 is sufficiently rigid so as to restrict significant relative movement between the left 140 and right side 142. The center of the wheel of the one side 140 to the center of the wheel of the other side 142 defines a track width. As the suspension 100 moves between the raised and lowered position, the track width and distance of each wheel to the vertical plane of the vehicle 10 would remain constant.

An alternate embodiment of the lowering suspension is shown in FIGS. 18-26. The lowering suspension 144 is affixed to and part of the vehicle 10. As shown, it is located near the rear portion of the vehicle 10. The vehicle 10 is supported by front 54 and rear 40 wheels. In this embodiment, the vehicle 10 is propelled by the front wheels 54, but it is contemplated that the vehicle 10 is powered by either or both the front wheels 54 or rear wheels 40. The vehicle 10 has a structure for attaching suspension and drivetrain components. In this embodiment, the vehicle 10 is shown with a frame 12. It is contemplated that either a frame or a unibody forms the structure. The vehicle 10 has a cargo surface 44 that is affixed to the frame 12. The cargo surface 44 is located between the rear wheels 40 and frame 12. This alternate embodiment allows for an unobstructed area 43, shown in FIG. 20. In the event an unobstructed area 43 is implemented and the cargo surface 44 is uninterrupted between the sides of the frame 12, the cargo surface 44 will have structural properties to handle cargo without deforming or bowing. The cargo surface 44 shown in FIGS. 21 and 22 show it as a thin sheet, but it is contemplated that it would be thickened or supported for the anticipated cargo that would be carried by the vehicle 10. The frame 12 is located on the perimeter of the cargo surface 44 with a leading edge 161 and a trailing edge 162. The frame 12, shown in FIGS. 21 and 22, has a floor support portion 13 and a vertical portion 15.

To maximize the width of the cargo surface 44 and extend it beyond the rear wheels 40, the frame 12 is split into an upper portion 146 extends directly over the rear wheels 40 and a lower portion 148 that is adjacent the rear wheels 40. The upper portion 146 can take the form of a fender over the rear wheels 40 to provide protection from road debris, water intrusion, or other shielding. A side wall 150 may be included to further shield the cargo surface 44. These are shown in FIGS. 21-22.

The lowering suspension 144 has pivoting arms 152, 154. The pivoting arms 152, 154 are mirror symmetrical across the centerline of the vehicle 10. FIGS. 21-24 focus on the details of pivoting arm 152, but pivoting arm 154 has identically mirrored features. The pivot arm 152 pivots about a pin 156 about a pivot axis 158. The pin 156 is secured to the frame 12 on the vertical portion 15 of the frame 12 and a mount portion 17, shown in FIG. 22. The pivot arm 152 may have two portions, a trailing portion 153 and an actuation portion 155. As shown in FIG. 22, the pivot axis 158 is located above the cargo surface 44. The pivot arm 152 has a spindle 160 that is located at a far end. The spindle 160 is located on the trailing portion 153 and where the rear wheel 40 is affixed and rotates. The spindle 160 may further include brakes, sensors, and other components commonly used with vehicles and well-known in the art. These are not shown but are contemplated. The pivoting arm 152 can pivot between a raised position (shown in FIGS. 18 and 23) and a lowered position (shown in FIGS. 19 and 24). The lowered position allows the cargo surface 44, particularly the far edge 162 to either contact the ground 50 or be very close to it. Moving the far edge 162 to the ground 50 allows the user to load cargo without the need for raising it off of the ground 50. The user may require a forklift, hand truck, pallet jack, or a strong back to lift it. By lowering the far edge 162, the user may simply roll or push the cargo onto the cargo surface 44.

To move the pivoting arm 152 between the raised and lowered positions, an actuator 164 is required. The actuator 164 may be pneumatic, hydraulic, electric, other technology, or any combination thereof. The actuator 164 shown is a bellows pneumatic, commonly used in adjustable suspension. It is affixed to the frame 12 at a fixed end 166 and the actuation portion 155 of the pivoting arm 152 at the moving end 168. The ends 166, 168 and pivot axis 158 are located above the cargo surface 44.

Figure 25:
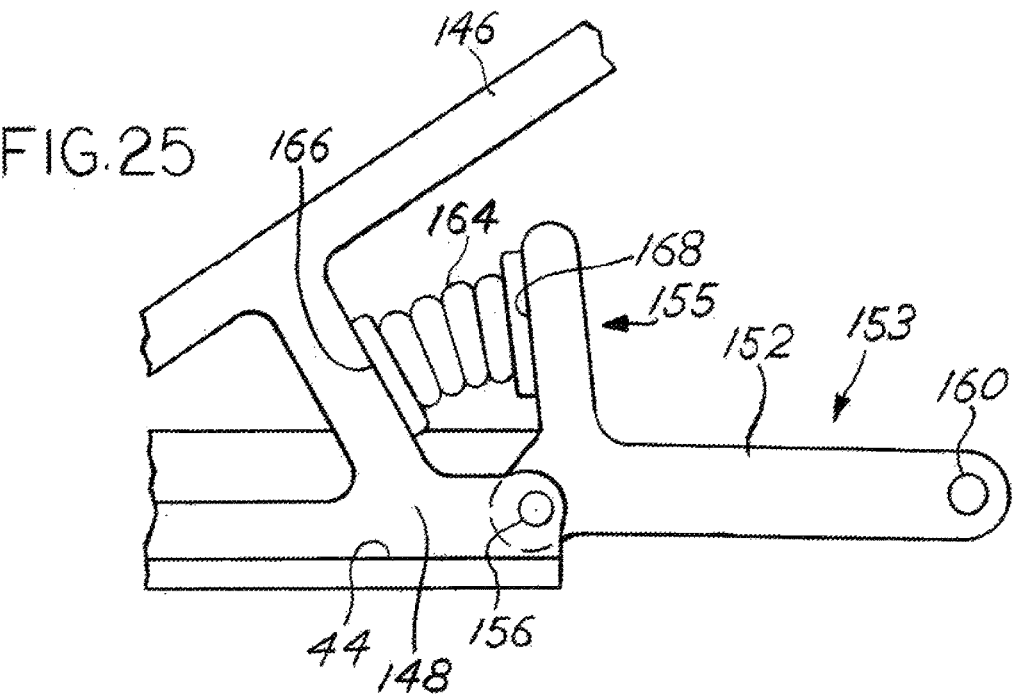
FIG. 25 is a view of the suspension in FIG. 19 with the arm in the raised position.
Figure 26:
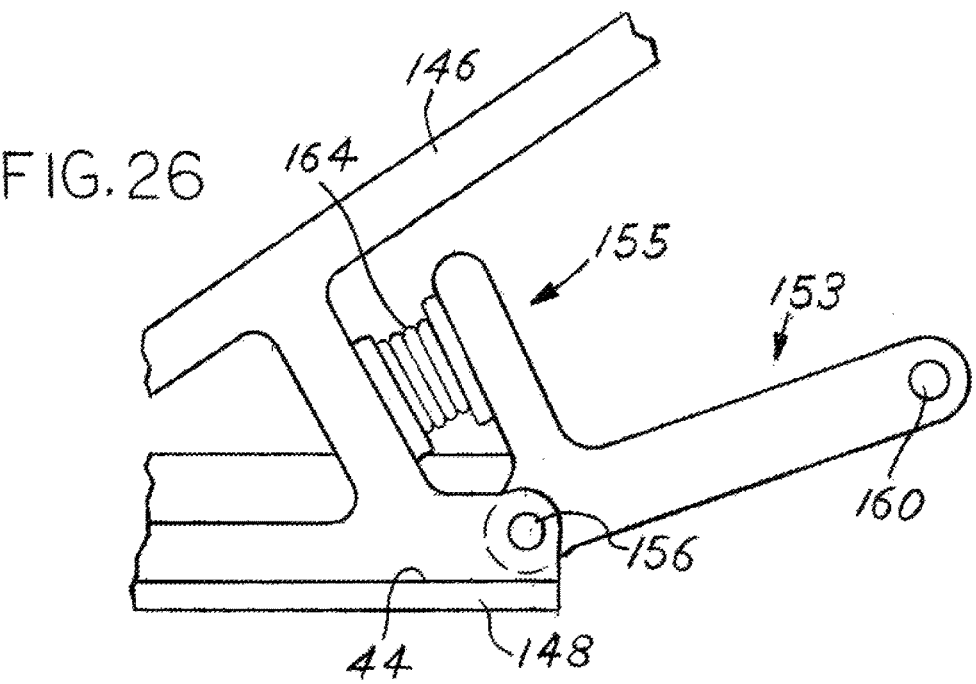
FIG. 26 is a view of the suspension in FIG. 19 with the arm in the lowered position.

In FIGS. 25-26, a hydraulic cylinder 170 moves an alternately shaped pivoting arm 152 between the raised and lowered position. While shaped alternatively, the pivoting arm 152 still retains the trailing portion 153 and actuation portion 155. The cylinder 170 has a frame-mounted pivot point 172 and a pivoting arm pivot point 174 where it is attached to the pivot arm 152. The pivot points 172, 174 and pivot axis 158 are located above the cargo surface 44.

As with the other embodiments of the lowering suspension, the pivot arms 152, 154 may be coupled through a sway or stabilizer bar that is affixed to the vehicle 10 under the cargo surface 44. Stabilizer bars are well-known in the art. Both pivot arms 152, 154 pivot about the pivot axis 158 and the rear wheels 40 remain at a fixed distance from the centerline of the vehicle 10 as they move between the raised and lowered position. This is shown in FIG. 21.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A lowering suspension for a vehicle having front wheels and rear wheels, one of said wheels being a driving wheel, said vehicle having a centrally located longitudinal axis, a frame affixed to said vehicle, said lowering suspension comprising:
  a cargo surface located between said rear wheels, said cargo surface affixed to a portion of said frame;
  a first pivoting arm, said first pivoting arm spaced from said longitudinal axis, said first pivoting arm having a first pivot point, said first pivoting arm having a first spindle affixed thereto, said first spindle having a first spindle axis;
  a second pivoting arm, said second pivoting arm spaced from said longitudinal axis, said second pivoting arm having a second pivot point, said second pivoting arm having a second spindle affixed thereto, said second spindle having a second spindle axis;
  said first pivoting arm pivotably affixed to said frame at said first pivot point, said second pivoting arm pivotably affixed to said frame at said second pivot point, said first pivot point and said second pivot point forming a pivot axis being substantially perpendicular to said longitudinal axis, said pivot axis is located above said cargo surface;

one of said rear wheels being a wheel rotatable with respect to said first spindle axis, the other of said rear wheels being a wheel rotatable with respect to said second spindle axis;

a first actuator having a first end and a second end, said first end attached to said vehicle, said second end attached to said first pivoting arm, said first actuator movable between a retracted position and an extended position, said first actuator pivoting said first pivoting arm between a raised and lowered position about said first pivot point, said retracted position of said first actuator corresponding to said lowered position of said first pivoting arm and said extended position of said first actuator corresponding to said raised position of said first pivoting arm;

when said first pivoting arm is in said lowered position, said first spindle axis is located above said cargo surface at a first lowered distance, when said first pivoting arm is in said raised position, said first spindle axis is located above said cargo surface at a first raised distance, said first lowered distance being greater than said first raised distance;

a second actuator having a first end and a second end, said first end attached to said vehicle, said second end attached to said second pivoting arm, said second actuator movable between a retracted position and an extended position, said second actuator pivoting said second pivoting arm between a raised and lowered position about said second pivot point, said retracted position of said second actuator corresponding to said lowered position of said second pivoting arm and said extended position of said second actuator corresponding to said raised position of said second pivoting arm;

when said second pivoting arm is in said lowered position, said second spindle axis is located above said cargo surface at a second lowered distance, when said second pivoting arm is in said raised position, said second spindle axis is located above said cargo surface at a second raised distance, said second lowered distance being greater than said second raised distance; and said first pivoting arm remaining parallel to said second pivoting arm at all points between said raised and said lowered positions of each said pivoting arms.

2. The lowering suspension of claim 1, wherein said frame has a first upper portion and a first lower portion, said first upper portion located above said first spindle, said first lower portion located adjacent first pivoting arm, said first upper portion affixed to said first lower portion, said frame has a second upper portion and a second lower portion, said second upper portion located above said second spindle, said second lower portion located adjacent second pivoting arm, said second upper portion affixed to said second lower portion.

3. The lowering suspension of claim 2, said vehicle having a track width defined by a distance between said one wheel and said other wheel, said track width remaining substantially constant between said raised and said lowered position.

4. The lowering suspension of claim 1, wherein said lowering suspension is substantially mirror symmetrical about a vertical plane intersecting said longitudinal axis.

5. The lowering suspension of claim 4, said first pivoting arm coupled to said second pivoting arm through a sway bar, said sway bar pivotally connected to said vehicle underneath said cargo surface.

6. The lowering suspension of claim 1, said first actuator affixed to said first pivoting arm between said first spindle and said first pivot point, said second actuator affixed to said second pivoting arm between said second spindle and said second pivot point.

7. The lowering suspension of claim 1, wherein said first pivot point is located closer to said spindle on said first pivot arm than said first actuator and said second pivot point is located closer to said spindle on said second pivot arm than said second actuator.

8. The lowering suspension of claim 1, wherein said first actuator is located closer to said spindle on said first pivot arm than said first pivot point and said second actuator is located closer to said spindle on said second pivot arm than said second pivot point.

9. A lowering suspension for a vehicle having front wheels and rear wheels, one of said wheels being a driving wheel, said vehicle having a centrally located longitudinal axis, a frame affixed to said vehicle, said lowering suspension comprising:

a cargo surface located between said rear wheels, said cargo surface affixed to a portion of said frame;

a first pivoting arm, said first pivoting arm spaced from said longitudinal axis, said first pivoting arm having a first pivot point, said first pivoting arm having a first spindle affixed thereto, said first spindle having a first spindle axis;

said first pivoting arm pivotably affixed to said frame at said first pivot point, said first pivot point located on a pivot axis being substantially perpendicular to said longitudinal axis, said pivot axis is located above said cargo surface;

one of said rear wheels being a wheel rotatable with respect to said first spindle axis;

a first actuator having a first end and a second end, said first end attached to said vehicle, said second end attached to said first pivoting arm, said first actuator movable between a retracted position and an extended position, said first actuator pivoting said first pivoting arm between a raised and lowered position about said first pivot point, said retracted position of said first actuator corresponding to said lowered position of said first pivoting arm and said extended position of said first actuator corresponding to said raised position of said first pivoting arm;

when said first pivoting arm is in said lowered position, said first spindle axis is located above said cargo surface at a first lowered distance, when said first pivoting arm is in said raised position, said first spindle axis is located above said cargo surface at a first raised distance, said first lowered distance being greater than said first raised distance;

said first pivoting arm remaining parallel to said longitudinal axis at all points between said raised and said lowered positions; and said frame has a first upper portion and a first lower portion, a portion of said first upper portion located above said first spindle, said first lower portion affixed to said first upper portion, said first lower portion located adjacent first pivoting arm.

10. The lowering suspension of claim 9, wherein said lowering suspension is substantially mirror symmetrical about a vertical plane intersecting said longitudinal axis.

11. The lowering suspension of claim 10, wherein said first pivoting arm coupled to a second pivoting arm through a sway bar, said sway bar pivotally connected underneath said cargo surface.

12. The lowering suspension of claim 10, said vehicle having a track width defined by a distance between said one wheel and another said wheel, said track width remaining substantially constant between said raised and said lowered position.

13. The lowering suspension of claim 9, said first actuator affixed to said first pivoting arm between said first spindle and said first pivot point.

14. The lowering suspension of claim 9, wherein said first pivot point is located closer to said spindle on said first pivoting arm than said first actuator.

15. The lowering suspension of claim 9, wherein said first actuator is located closer to said spindle on said first pivoting arm than said first pivot point.

16. The lowering suspension of claim 9, wherein said lowering suspension and said frame are substantially mirror symmetrical about a vertical plane intersecting said longitudinal axis.

17. A lowering suspension for a vehicle having front wheels and rear wheels, one of said wheels being a driving wheel, said vehicle having a centrally located longitudinal axis, a frame affixed to said vehicle, said lowering suspension comprising:

a cargo surface located between said rear wheels, said cargo surface affixed to a portion of said frame, said frame having an unobstructed opening located between floor support portions of said frame, said cargo surface overlaying said floor support portions;

a first pivoting arm, said first pivoting arm spaced from said longitudinal axis, said first pivoting arm having a first pivot point, said first pivoting arm having a first spindle affixed thereto, said first spindle having a first spindle axis;

said first pivoting arm pivotably affixed to said frame at said first pivot point, said first pivot point located on a pivot axis being substantially perpendicular to said longitudinal axis, said pivot axis is located above said cargo surface;

one of said rear wheels being a wheel rotatable with respect to said first spindle axis;

a first actuator having a first end and a second end, said first end attached to said vehicle, said second end attached to said first pivoting arm, said first actuator movable between a retracted position and an extended position, said first actuator pivoting said first pivoting arm between a raised and lowered position about said first pivot point, said retracted position of said first actuator corresponding to said lowered position of said first pivoting arm and said extended position of said first actuator corresponding to said raised position of said first pivoting arm;

when said first pivoting arm is in said lowered position, said first spindle axis is located above said cargo surface at a first lowered distance, when said first pivoting arm is in said raised position, said first spindle axis is located above said cargo surface at a first raised distance, said first lowered distance being greater than said first raised distance; and said first pivoting arm remaining parallel to said longitudinal axis at all points between said raised and said lowered positions.

18. The lowering suspension of claim 17, wherein said lowering suspension is substantially mirror symmetrical about a vertical plane intersecting said longitudinal axis.

19. The lowering suspension of claim 18, wherein said first pivoting arm coupled to a second pivoting arm through a sway bar, said sway bar pivotally connected underneath said cargo surface.

20. The lowering suspension of claim 17, wherein said frame has a first upper portion and a first lower portion, a portion of said first upper portion located above said first spindle, said first lower portion affixed to said first upper portion, said first lower portion located adjacent first pivoting arm.

* * * * *